(12) United States Patent
Harikumar et al.

(10) Patent No.: US 8,315,299 B2
(45) Date of Patent: Nov. 20, 2012

(54) TIME-DOMAIN EQUALIZATION FOR DISCRETE MULTI-TONE SYSTEMS

(75) Inventors: Gopal Harikumar, Norwood, MA (US); Daniel J. Marchok, Buchanan, MI (US); Kenneth J. Rudofski, Chicago, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 13/042,067

(22) Filed: Mar. 7, 2011

(65) Prior Publication Data

US 2011/0293053 A1    Dec. 1, 2011

Related U.S. Application Data

(60) Division of application No. 12/209,023, filed on Sep. 11, 2008, now Pat. No. 7,916,801, which is a continuation of application No. 10/898,499, filed on Jul. 23, 2004, now Pat. No. 7,440,498, which is a continuation of application No. 10/320,920, filed on Dec. 17, 2002, now Pat. No. 6,785,328, which is a division of application No. 09/233,914, filed on Jan. 21, 1999, now Pat. No. 6,526,105.

(60) Provisional application No. 60/087,336, filed on May 29, 1998.

(51) Int. Cl.
 *H03H 7/30* (2006.01)

(52) U.S. Cl. ........................................ 375/232; 375/229

(58) Field of Classification Search ................... 375/232, 375/229, 222, 237, 350; 708/300, 322, 323
See application file for complete search history.

(56) References Cited

U.S. PATENT DOCUMENTS

| | | | |
|---|---|---|---|
| 3,795,772 A | 3/1974 | Hill et al. |
| 3,978,482 A | 8/1976 | Williams |
| 4,184,347 A | 1/1980 | Tobita et al. |
| 4,300,229 A | 11/1981 | Hirosaki |
| 4,351,983 A | 9/1982 | Crouse et al. |
| 4,361,813 A | 11/1982 | Watatani |
| 4,399,329 A | 8/1983 | Wharton |
| 4,425,665 A | 1/1984 | Stauffer |
| 4,535,472 A | 8/1985 | Tomcik |

(Continued)

FOREIGN PATENT DOCUMENTS

EP     0 768 778 A1    4/1997

(Continued)

OTHER PUBLICATIONS

Bingham, "Multicarrier Modulation for Data Transmission: An Idea Whose Time has Come," pp. 5-8, 11-14 (1990).

(Continued)

*Primary Examiner* — Khai Tran
(74) *Attorney, Agent, or Firm* — Hamilton, Brook, Smith & Reynolds, P.C.

(57) ABSTRACT

A multiple carrier communication system includes a primary impulse shortening filter that receives an output signal of an analog to digital converter and accepts coefficients. A secondary impulse shortening filter receives the output signal of the analog to digital converter, outputs an output signal, and passes coefficients to the primary impulse shortening filter. A reference signal generator outputs a reference signal. A comparator compares the output signal and the reference signal and outputs a resulting error signal. An adaptive processor computes coefficients for the secondary impulse shortening filter based on the error signal.

22 Claims, 12 Drawing Sheets

U.S. PATENT DOCUMENTS

| | | | |
|---|---|---|---|
| 4,618,996 A | 10/1986 | Rafal et al. | |
| 4,630,305 A | 12/1986 | Borth et al. | |
| 4,731,816 A | 3/1988 | Hughes-Hartogs | |
| 4,817,141 A | 3/1989 | Taguchi | |
| 4,931,803 A | 6/1990 | Shimko | |
| 4,951,279 A | 8/1990 | Hotta | |
| 4,956,835 A | 9/1990 | Grover | |
| 4,980,897 A | 12/1990 | Decker et al. | |
| 5,001,724 A | 3/1991 | Birgenheier et al. | |
| 5,014,306 A | 5/1991 | Rodgers et al. | |
| 5,077,727 A | 12/1991 | Suzuki | |
| 5,103,459 A | 4/1992 | Gilhousen et al. | |
| 5,192,957 A | 3/1993 | Kennedy | |
| 5,206,886 A | 4/1993 | Bingham | |
| 5,216,670 A | 6/1993 | Ofek et al. | |
| 5,228,025 A | 7/1993 | LeFloch et al. | |
| 5,233,546 A | 8/1993 | Witte | |
| 5,235,621 A | 8/1993 | Amir-Alikhani | |
| 5,253,270 A | 10/1993 | Petit | |
| 5,260,968 A | 11/1993 | Gardner et al. | |
| 5,285,474 A | 2/1994 | Chow et al. | |
| 5,301,205 A | 4/1994 | Tsutsui et al. | |
| 5,323,255 A | 6/1994 | Sierens et al. | |
| 5,345,599 A | 9/1994 | Paulraj et al. | |
| 5,406,627 A | 4/1995 | Thompson et al. | |
| 5,414,433 A | 5/1995 | Chang | |
| 5,416,767 A | 5/1995 | Koppelaar et al. | |
| 5,416,801 A | 5/1995 | Chouly et al. | |
| 5,444,697 A | 8/1995 | Leung et al. | |
| 5,461,640 A | 10/1995 | Gatherer | |
| 5,471,464 A | 11/1995 | Ikeda | |
| 5,479,447 A | 12/1995 | Chow et al. | |
| 5,483,529 A | 1/1996 | Baggen et al. | |
| 5,499,271 A | 3/1996 | Plenge et al. | |
| 5,502,749 A | 3/1996 | Ozaki | |
| 5,521,908 A | 5/1996 | Younce et al. | |
| 5,524,001 A | 6/1996 | Beaudry et al. | |
| 5,530,703 A | 6/1996 | Liu et al. | |
| 5,539,777 A | 7/1996 | Grube et al. | |
| 5,548,819 A | 8/1996 | Robb | |
| 5,553,064 A | 9/1996 | Paff et al. | |
| 5,557,612 A | 9/1996 | Bingham | |
| 5,559,789 A | 9/1996 | Nakano et al. | |
| 5,566,209 A | 10/1996 | Forssen et al. | |
| 5,568,483 A | 10/1996 | Padovani et al. | |
| 5,583,967 A | 12/1996 | Akagiri | |
| 5,594,757 A | 1/1997 | Rohani | |
| 5,596,582 A | 1/1997 | Sato et al. | |
| 5,596,605 A * | 1/1997 | Kiyanagi et al. | 375/326 |
| 5,602,835 A | 2/1997 | Seki et al. | |
| 5,603,081 A | 2/1997 | Raith et al. | |
| 5,608,725 A | 3/1997 | Grube et al. | |
| 5,608,764 A | 3/1997 | Sugita et al. | |
| 5,610,908 A | 3/1997 | Shelswell et al. | |
| 5,621,730 A | 4/1997 | Kelley | |
| 5,625,651 A | 4/1997 | Cioffi | |
| 5,627,863 A | 5/1997 | Aslanis et al. | |
| 5,636,246 A | 6/1997 | Tzannes et al. | |
| 5,636,250 A | 6/1997 | Scarpa | |
| 5,675,572 A | 10/1997 | Hidejima et al. | |
| 5,675,608 A | 10/1997 | Kim et al. | |
| 5,682,376 A | 10/1997 | Hayashino et al. | |
| 5,684,920 A | 11/1997 | Iwakami et al. | |
| 5,687,165 A | 11/1997 | Daffara et al. | |
| 5,694,389 A | 12/1997 | Seki et al. | |
| 5,703,873 A | 12/1997 | Ojanpera et al. | |
| 5,708,662 A | 1/1998 | Takashima | |
| 5,726,978 A | 3/1998 | Frodigh et al. | |
| 5,732,068 A | 3/1998 | Takahashi et al. | |
| 5,771,024 A | 6/1998 | Reece et al. | |
| 5,774,450 A | 6/1998 | Harada et al. | |
| 5,778,001 A | 7/1998 | Nakayama et al. | |
| 5,784,363 A | 7/1998 | Engstrom et al. | |
| 5,786,844 A | 7/1998 | Rogers et al. | |
| 5,790,514 A | 8/1998 | Marchok et al. | |
| 5,790,516 A | 8/1998 | Gudmundson et al. | |
| 5,790,554 A | 8/1998 | Pitcher et al. | |
| 5,790,615 A | 8/1998 | Beale et al. | |
| 5,790,784 A | 8/1998 | Beale et al. | |
| 5,796,820 A | 8/1998 | Sasada | |
| 5,809,030 A | 9/1998 | Mestdagh et al. | |
| 5,812,523 A | 9/1998 | Isaksson et al. | |
| 5,812,599 A | 9/1998 | Van Kerckhove | |
| 5,815,488 A | 9/1998 | Williams et al. | |
| 828,710 A | 10/1998 | Beale | |
| 5,841,813 A | 11/1998 | Van Nee | |
| 5,844,951 A | 12/1998 | Proakis et al. | |
| 5,850,444 A | 12/1998 | Rune | |
| 5,862,007 A | 1/1999 | Pham et al. | |
| 5,864,546 A | 1/1999 | Campanella | |
| 5,867,764 A | 2/1999 | Williams | |
| 5,870,432 A | 2/1999 | Kerckhove | |
| 5,881,047 A | 3/1999 | Bremer et al. | |
| 5,890,187 A | 3/1999 | Asghar | |
| 5,909,465 A | 6/1999 | Bottomley et al. | |
| 5,912,919 A | 6/1999 | Lomp et al. | |
| 5,912,920 A | 6/1999 | Marchok et al. | |
| 5,919,137 A | 7/1999 | Finger et al. | |
| 5,933,421 A | 8/1999 | Alamouti et al. | |
| 5,936,961 A | 8/1999 | Chiodini et al. | |
| 5,949,796 A | 9/1999 | Kumar | |
| 5,983,078 A | 11/1999 | Bossard | |
| 5,984,514 A | 11/1999 | Greene et al. | |
| 5,987,063 A | 11/1999 | Rinne | |
| 5,995,483 A | 11/1999 | Marchok et al. | |
| 5,995,568 A | 11/1999 | Molnar et al. | |
| 6,002,722 A | 12/1999 | Wu | |
| 6,009,130 A | 12/1999 | Lurey et al. | |
| 6,018,317 A | 1/2000 | Dogan et al. | |
| 6,023,674 A | 2/2000 | Mekuria | |
| 6,028,891 A | 2/2000 | Ribner et al. | |
| 6,035,000 A | 3/2000 | Bingham | |
| 6,044,107 A | 3/2000 | Gatherer et al. | |
| 6,047,020 A | 4/2000 | Hottinen | |
| 6,047,025 A * | 4/2000 | Johnson et al. | 375/232 |
| 6,055,362 A | 4/2000 | Kesner et al. | |
| 6,055,575 A | 4/2000 | Paulsen et al. | |
| 6,061,796 A | 5/2000 | Chen et al. | |
| 6,069,917 A | 5/2000 | Werner et al. | |
| 6,072,782 A | 6/2000 | Wu | |
| 6,073,176 A | 6/2000 | Baindur et al. | |
| 6,073,179 A | 6/2000 | Liu et al. | |
| 6,075,777 A | 6/2000 | Agrawal et al. | |
| 6,075,816 A | 6/2000 | Werner et al. | |
| 6,079,020 A | 6/2000 | Liu | |
| 6,088,386 A | 7/2000 | Spruyt et al. | |
| 6,091,932 A | 7/2000 | Langlais | |
| 6,097,763 A | 8/2000 | Djokovic et al. | |
| 6,101,230 A | 8/2000 | Chun et al. | |
| 6,104,930 A | 8/2000 | Ward et al. | |
| 6,108,349 A | 8/2000 | Melsa et al. | |
| 6,108,610 A | 8/2000 | Winn | |
| 6,118,758 A | 9/2000 | Marchok et al. | |
| 6,122,246 A | 9/2000 | Marchok et al. | |
| 6,122,260 A | 9/2000 | Liu et al. | |
| 6,125,150 A | 9/2000 | Wesel et al. | |
| 6,128,276 A | 10/2000 | Agee | |
| 6,134,591 A | 10/2000 | Nickles | |
| 6,141,317 A | 10/2000 | Marchok et al. | |
| 6,141,335 A | 10/2000 | Kuwahara et al. | |
| 6,144,340 A | 11/2000 | Kiiski et al. | |
| 6,144,711 A | 11/2000 | Raleigh et al. | |
| 6,148,023 A | 11/2000 | Pelin et al. | |
| 6,148,024 A | 11/2000 | Ho et al. | |
| 6,154,839 A | 11/2000 | Arrow et al. | |
| 6,185,251 B1 | 2/2001 | Fertner | |
| 6,185,257 B1 | 2/2001 | Moulsley | |
| 6,212,175 B1 | 4/2001 | Harsch | |
| 6,212,635 B1 | 4/2001 | Reardon | |
| 6,259,729 B1 | 7/2001 | Seki | |
| 6,266,367 B1 | 7/2001 | Strait | |
| 6,272,108 B1 | 8/2001 | Chapman | |
| 6,279,022 B1 | 8/2001 | Miao et al. | |
| 6,285,654 B1 | 9/2001 | Marchok et al. | |
| 6,308,213 B1 | 10/2001 | Valencia | |
| 6,320,902 B1 | 11/2001 | Nafie et al. | |
| 6,347,234 B1 | 2/2002 | Scherzer | |

| | | | |
|---|---|---|---|
| 6,347,237 B1 | 2/2002 | Eden et al. | |
| 6,353,629 B1 | 3/2002 | Pal | |
| 6,353,630 B1 | 3/2002 | Schreib | |
| 6,353,636 B1 | 3/2002 | Tate et al. | |
| 6,370,156 B2 | 4/2002 | Spruyt et al. | |
| 6,427,134 B1 | 7/2002 | Garner et al. | |
| 6,466,557 B1 | 10/2002 | Doi | |
| 6,473,394 B1 | 10/2002 | Marchok et al. | |
| 6,487,252 B1 | 11/2002 | Kleider et al. | |
| 6,487,598 B1 | 11/2002 | Valencia | |
| 6,526,105 B1 | 2/2003 | Harikumar et al. | |
| 6,529,868 B1 | 3/2003 | Chandran et al. | |
| 6,557,037 B1 | 4/2003 | Provino | |
| 6,631,175 B2 | 10/2003 | Harikumar et al. | |
| 6,654,429 B1 | 11/2003 | Li | |
| 6,690,680 B1 | 2/2004 | Marchok et al. | |
| 6,765,881 B1 | 7/2004 | Rajakarunanayake | |
| 6,771,590 B1 | 8/2004 | Marchok et al. | |
| 6,772,332 B1 | 8/2004 | Boebert et al. | |
| 6,795,424 B1 | 9/2004 | Kapoor et al. | |
| 6,804,192 B1 | 10/2004 | Marchok et al. | |
| 6,884,192 B2 | 4/2005 | Konno et al. | |
| 6,912,194 B1 | 6/2005 | Marchok et al. | |
| 6,948,076 B2 | 9/2005 | Saito | |
| 6,950,388 B2 | 9/2005 | Marchok et al. | |
| 6,999,772 B2 | 2/2006 | Song et al. | |
| 7,010,608 B2 | 3/2006 | Garg et al. | |
| 7,032,242 B1 | 4/2006 | Grabelsky et al. | |
| 7,058,572 B1 | 6/2006 | Nemer | |
| 7,096,182 B2 | 8/2006 | Chandran et al. | |
| 7,254,178 B2 | 8/2007 | Harikumar et al. | |
| 7,369,990 B2 | 5/2008 | Nemer | |
| 7,424,424 B2 | 9/2008 | Chandran et al. | |
| 7,430,242 B2 | 9/2008 | Harikumar et al. | |
| 7,440,498 B2 | 10/2008 | Harikumar et al. | |
| 7,471,734 B2 | 12/2008 | Thomas et al. | |
| 7,613,102 B2 | 11/2009 | Marchok et al. | |
| 7,616,553 B2 | 11/2009 | Marchok et al. | |
| 2001/0020241 A1 | 9/2001 | Kawamoto et al. | |
| 2001/0040920 A1 | 11/2001 | Nafie et al. | |
| 2002/0007454 A1 | 1/2002 | Tarpenning et al. | |
| 2002/0078379 A1 | 6/2002 | Edwards et al. | |
| 2002/0098795 A1 | 7/2002 | Brede et al. | |
| 2002/0105928 A1 | 8/2002 | Kapoor et al. | |
| 2002/0147791 A1 | 10/2002 | Choi | |
| 2003/0040908 A1 | 2/2003 | Yang et al. | |
| 2003/0128695 A1 | 7/2003 | Park | |
| 2003/0193917 A1 | 10/2003 | Song et al. | |
| 2003/0196087 A1 | 10/2003 | Stringer et al. | |
| 2004/0091056 A1 | 5/2004 | Harikumar et al. | |
| 2004/0184484 A1 | 9/2004 | Marchok et al. | |
| 2004/0240669 A1 | 12/2004 | Kempf et al. | |
| 2004/0246890 A1 | 12/2004 | Marchok et al. | |
| 2006/0034166 A1 | 2/2006 | Marchok et al. | |
| 2006/0229869 A1 | 10/2006 | Nemer | |
| 2007/0033642 A1 | 2/2007 | Ganesan et al. | |
| 2007/0070960 A1 | 3/2007 | Barak et al. | |
| 2007/0110096 A1 | 5/2007 | Geile et al. | |
| 2008/0144487 A1 | 6/2008 | Marchok et al. | |
| 2008/0144731 A1 | 6/2008 | Marchok et al. | |
| 2008/0298483 A1 | 12/2008 | Marchok et al. | |
| 2009/0022216 A1 | 1/2009 | Harikumar et al. | |
| 2009/0024387 A1 | 1/2009 | Chandran et al. | |

FOREIGN PATENT DOCUMENTS

| | | |
|---|---|---|
| EP | 1 017 206 A2 | 7/2000 |
| JP | 10-504168 A | 4/1998 |
| JP | 11-203248 A | 7/1999 |
| JP | 2001-134534 A | 5/2001 |
| JP | 2001-237818 A | 8/2001 |
| WO | WO 87/00366 A1 | 1/1987 |
| WO | WO 93/26096 | 12/1993 |
| WO | WO 95/15550 A1 | 6/1995 |
| WO | WO 99/52250 A1 | 10/1999 |
| WO | WO 00/41169 A1 | 7/2000 |
| WO | WO 00/49755 A2 | 8/2000 |
| WO | WO 01/73760 A1 | 10/2001 |

OTHER PUBLICATIONS

Whittle, "The Optus Vision: Telephony, Internet, and Video," *Australian Communications*, 7 pages (1996).

"Cablespan 2300," Training Presentation, Tellabs, Inc., pp. 1-17 (1996).

Moose, "A Technique for Orthogonal Frequency Division Multiplexing Frequency Offset Correction," *IEEE Transactions on Communications*, vol. 42, No. 10 (1994).

Jacobsen, et al., "Synchronized DMT for Multipoint-to-point Communications on HFC Networks," *Information Systems Laboratory, IEEE Global Communications Conference in Singapore*, pp. 1-10 (1995).

International Search Report for Int'l Application No. PCT/US01/06889; Date Mailed: Jun. 7, 2001.

International Preliminary Examination Report for Int'l Application No. PCT/US01/06889; Date Mailed: Aug. 5, 2002.

IEEE Transactions on Acoustics, Speech and Signal Processing, vol. 28, No. 2, Apr. 1980, pp. 137-145, "Speech Enhancement Using a soft-Decision Noise Suppression Filter," Robert J. McCaulay and Marilyn L. Malpass.

IEEE Conference on Acoustics, Speech and Signal Processing, Apr. 1979, pp. 208-211, "Enhancement of Speech Corrupted by Acoustic Noise," M. Berouti, R. Schwartz and J. Makhoul.

Advanced Signal Processing and Digital Noise Reduction, 1996, Chapter 9, pp. 242-260, Saeed V. Vaseght (ISBN Wiley 0471958751).

Proceedings of the IEEE, vol. 67, No. 12, Dec. 1979, pp. 1586-1604, "Enhancement and Bandwidth Compression by Noisy Speech," Jake S. Lim and Alan V. Oppenheirn.

Cimini, "Analysis and Simulation of a Digital Mobile Channel Using Orthogonal Frequency Division Multiplexing," *IEEE Transactions on Communication*, pp. 665-675 (Jul. 1985).

Kennedy et al., "Direction Finding and 'Smart Antennas' Using Software Radio Architectures," *IEEE Communications Magazine*, pp. 62-68 (May, 1995).

Paulraj, "Antenna Array Signal Processing with Applications to Mobile Communications," *Second Workshop on Smart Antennas in Wireless Mobile Communications*, Stanford University, Stanford, CA 94305, (Jul. 1995) pp. 1-120.

Russell et al., "Terrestrial Digital Video Broadcasting for Mobile Reception using OFDM," *Wireless Personal Communications*, 2: 45-66 (1995).

Swales et al., "The Performance Enhancement of Multi-Beam Adaptive Base-Station Antennas for Cellular Land Mobile Radio Systems," *IEEE Transactions on Vehicular Technology*, 39(1): 56-77 (Feb. 1990).

"Guide to Choosing a Wireless Base Station Antenna System," pp. 7-11 (date unknown).

VDSL Alliance SDMT VDSL Draft Standard Proposal, Technical Report T1E1.4/98-172, ANSI 1998.

DMT Group VDSL PMD Draft Standard Proposal, Technical Report T1E1.4/96-32R2, ANSI 1997.

Very High-Speed Digital Subscriber Lines, Draft Technical Report-Revision 9, T1E1.4/97-131, ANSI 1997.

Schneier, Bruce, "Applied Cryptography, Protocols, Algorithms, and Source Code in C; ISBN: 0-471-11709-9, 0-471-12845-7," 1996, John Wiley and Sons, Inc., New York, XP002230276.

Melsa, Peter J.W. et al., "Impulse Response Shortening for Discrete Multitone Transceivers," IEEE Transactions on Communications, vol. 44, No. 12, pp. 1662-1672 (Dec. 1995).

Al-Dhahir, Naofal, "Joint Channel and Echo Impulse Response Shortening on Digital Subscriber Lines," IEEE Signal Processing Letters, vol. 3, No. 10, pp. 280-282 (Oct. 1996).

Falconer, D.D. et al., "Adaptive Channel Memory Truncation for Maximum Likelihood Sequence Estimation," The Bell System Technical Journal, vol. 52, No. 9, pp. 1541-1562 (Nov. 1973).

International Preliminary Examination Report, Aug. 13, 1999.

Melsa, Peter J.W. et al., "Optimal Impulse Response Shortening," Tellabs Research Center, Tellabs Operations, Inc., pp. 431-438, 1995.

Chow, Jacky S., "A Cost-Effective Maximum Likelihood Receiver for Multicarrier Systems," Proceedings of the International Conference on Communication, 1992, pp. 333.1-333.7.5, pp. 948-952.

Worthen, A. et al., "Simulation of VDSL Test Loops," Technical Report T1E1.4/97-288, ANSI, 1997, pp. 1-16.

Harikumar, G. et al., "Shortening the Channel Impulse Response of VDSL Loops for Multicarrier Applications," Tellabs Research, T1E1.4/97-289, pp. 1-7, 1997.

Harikumar, G. et al., "Minimizing Noise Bleeding in DMT Systems with a TEQ," Tellabs Research, T1E1.4/98-181, pp. 1-4, 1998.

Harikumar, G. et al., "Spectrally Constrained Impulse-Shortening Filters for Use in DMT Systems," Apr. 1998, pp. 1-9.

Jacobsen, K., VDSL Alliance-SDMT VDSL Draft Standard Proposal, Jun. 1-5, 1998, T1E1.4-172, pp. 1-48, 1998.

Jacobsen, K., DMT Group-VDSL PMD Draft Standard Proposal, T1E1.4-329R2, pp. 1-19, May 12, 1997.

Cimini, Jr., Leonard, J., Analysis and Simulation of a Digital Mobile Channel Using Orthogonal Frequency Division Multiplexing, IEEE Transactions on Communications, vol. COM-33, No. 7, pp. 665-675 (Jul. 1985).

Harikumar, G. et al., "Time-Domain Equalization in DMT Systems," Tellabs, Apr. 1998.

Melsa et al., "Joint Impulse Response Shortening," Global Telecommunication Conference 1996, "Communications: The Key to Global Prosperity," pp. 209-213 (Nov. 18-22, 1996).

Extended European Search Report dated Nov. 19, 2011, Application No. EP 10185268.9.

* cited by examiner

TIME-DOMAIN EQUALIZATION FOR DISCRETE MULTI-TONE SYSTEMS

RELATED APPLICATIONS

This application is a Divisional of U.S. application Ser. No. 12/209,023 filed Sep. 11, 2008, now U.S. Pat. No. 7,916,801 which is a Continuation of U.S. application Ser. No. 10/898, 499 filed Jul. 23, 2004, now U.S. Pat. No. 7,440,498, which is a Continuation of U.S. application Ser. No. 10/320,920 filed Dec. 17, 2002, now U.S. Pat. No. 6,785,328, which is a Divisional of U.S. application Ser. No. 09/233,914 filed Jan. 21, 1999, now U.S. Pat. No. 6,526,105 which claims the benefit of U.S. Application No. 60/087,336 filed May 29, 1998.

The parent application, U.S. application Ser. No. 12/209, 023, is also related to U.S. application Ser. No. 09/054,468 filed Apr. 3, 1998.

The entire teachings of the above applications are incorporated herein by reference.

BACKGROUND OF THE INVENTION

The invention relates to time-domain equalization in a discrete multi-tone (DMT) receiver.

Conventional single carrier modulation techniques translate data bits for transmission through a communication channel by varying the amplitude and/or phase of a single sinusoidal carrier. By contrast, DMT, which is also referred to as Orthogonal Frequency Division Multiplexing (OFDM) or Multicarrier Modulation (CM), employs a large number of sinusoidal subcarriers, e.g., 128 or 256 subcarriers. The available bandwidth of the communication channel is divided into subchannels and each subchannel communicates a part of the data. A DMT system may employ quadrature amplitude modulation (QAM) for each of the subcarriers.

OFDM-based systems transmit blocks of information bits. The time required to transmit one such block is called the symbol period. The time domain waveform that corresponds to one such block of bits is called a symbol.

Intersymbol interference (ISI) arises from the characteristics of practical communication channels and limits the rate at which information can be transmitted through them. Specifically, communication channels typically have an Effective Discrete-Time Impulse Response (EDIR) that is greater than one sample time in length, which causes ISI. ISI is a well-known phenomenon in single-carrier communication systems and there are many techniques for reducing it. The process of such ISI reduction is called equalization. ISI is discussed, for example, in Proakis, Digital Communications, McGraw Hill, 2nd Edition, 1989.

Equalization in OFDM-based systems is achieved by a two stage process. First, at the transmitter, a Cyclic Prefix (CP) is employed by affixing an end-portion of each symbol to the beginning of the symbol. A cyclic prefix that is greater than the EDIR of the channel prevents one symbol from interfering with another. Furthermore, it also facilitates a simple method of neutralizing the time domain spread of each symbol forced by the channel. This is achieved through a simple frequency domain process in the receiver which requires one multiplication operation for each subcarrier used. The use of a Cyclic Prefix to reduce ISI is discussed, for example, in: Cimini, "Analysis and Simulation of a Digital Mobile Channel using Orthogonal Frequency Division Multiplexing," IEEE Transactions on communications, pp 665-675, July 1985; Chow, "A Discrete Multi-Tone Transceiver System for HDSL applications," IEEE Journal on Selected Areas of Communications, 9(6):895-908, August 1991; and "DMT Group VDSL PMD Draft Standard Proposal," Technical Report, T1E1.4196-329R2, ANSI 1997.

Another problem arising in conventional DMT systems is noise bleeding, which occurs when noise from one frequency band interferes with a signal whose subcarrier is in another frequency band. Noise bleeding is caused, in general, by a discrete Fourier transform (DFT) operation at the receiver. Noise bleeding is discussed in for example, Worthen et. al., "Simulation of VDSL Test Loops," Technical Report T1E1.4/97-288, ANSI 1997.

In a perfectly synchronized DMT system, a signal in one frequency band does not interfere with a signal whose subcarrier is in another frequency band. However, noise from one band may interfere with other less noisy bands and render them unusable. Techniques for dealing with noise-bleeding include wavelet-based solutions. However, wavelet-based solutions are, in general, computationally intensive.

Other references dealing with time domain equalization include: Chow, J. S. and Cioffi, J. M., "A Cost-effective Maximum Likelihood Receiver for Multicarrier Systems", *Proceedings of the ICC*, 1992; Melsa, Peter J. W., Younce, Richard C., and Rohrs, Charles E., "Optimal Impulse Response Shortening", *Proceedings of the thirty-third Annual Allerton Conference on Communication, Control and Computing*, 1995, pp. 431-438; Harikumar, Copal and Marchok, Daniel, "Shortening the Channel Impulse Response of VDSL Loops for Multicarrier Applications", Technical report T1E1.4/97-289, ANSI, 1997.

SUMMARY

A spectrally constrained impulse shortening filter (SCISF) may be used, for example, in DMT systems. The coefficients of the SCISF may be computed efficiently. For example, the coefficients may be computed and changed through a training process that may occur upon start up of the communication system and periodically during its operation.

The SCISF serves two primary functions. First, it reduces intersymbol interference (ISI) by reducing the length of the effective discrete-time impulse response (EDIR) of the communication channel. Conventional impulse shortening filters may have deep nulls in their frequency response. By contrast, the SCISF has a filter characteristic that is essentially free from undesired nulls that may attenuate or completely eliminate certain subcarriers.

Second, the SCISF reduces noise bleeding between subchannels by attenuating noisy channels in a manner that does not reduce the signal to noise ratio (SNR) in these channels, but reduces the noise power that may appear in the sidelobes of adjacent subchannels. The SCISF accomplishes these functions by applying a frequency constraint to the signal based on a desired spectral response.

The coefficients of the SCISF are computed independent of the length of the cyclic prefix, the symbol length, and the frequency domain equalization characteristics of the system. The SCISF is particularly effective in systems in which additive noise dominates intersymbol interference, or in which noise bleeding predominates. The SCISF reduces noise bleeding with a filter structure that is shorter than that obtained with other techniques. Consequently, the SCISF is less complex and its coefficients are easier to compute, which reduces system complexity and cost. The SCISF may be particularly well suited, for example, for very high-speed digital subscriber lines (VDSL) systems, which generally have low intersymbol interference and tend to suffer from noise bleeding.

In addition, dynamic selection of a cyclic prefix (CP) that maximizes the data throughput for a communication channel having a particular noise profile is provided. Dynamic selection of the CP allows the communication system to adapt to changing noise conditions in the communication channel.

In one aspect, generally, a primary impulse shortening filter is adapted in a multiple carrier communication system. A secondary impulse shortening filter is provided. An output signal of the secondary impulse shortening filter is compared to a reference signal to compute an error signal. Coefficients of the secondary impulse shortening filter are computed in an adaptive processor based on the error signal. Coefficients of the primary impulse shortening filter are replaced with coefficients of the secondary impulse shortening filter.

Embodiments may include one or more of the following features. An output signal of the primary impulse shortening filter may be decoded to form output data. The output data may be encoded to form the reference signal. A discrete Fourier transform may be applied to the output signal of the primary impulse shortening filter prior to decoding the output signal. An inverse discrete Fourier transform may be applied to the encoded output data in forming the reference signal.

A digital signal may be received from an output of an analog to digital converter. The digital signal may be input to the primary impulse shortening filter. The digital signal may be delayed. The delayed digital signal may be input to the secondary impulse shortening filter and the adaptive processor.

The encoded output data may be scaled with a set of scaling factors in forming the reference signal. The scaling factors may be determined by: measuring received noise power spectral density, computing a desired spectral response based on the measured noise power, and computing the scaling factors so that the coefficients computed in the adaptive processor provide the secondary impulse shortening filter with a spectral response that matches the desired spectral response. A discrete Fourier transform may be applied to the output signal of the primary impulse shortening filter prior to decoding the output signal. The noise power spectral density may be measured at an output of the discrete Fourier transform. An inverse discrete Fourier transform may be applied to the scaled, encoded output data.

In another aspect, an impulse shortening filter is adapted in a multiple carrier communication system having a spectrally constrained impulse shortening filter. An output signal of the spectrally constrained impulse shortening filter is compared to a reference signal to compute an error signal. Coefficients of the spectrally constrained impulse shortening filter are computed in an adaptive processor based on the error signal.

Embodiments may include one or more of the following features. The reference signal may be a predetermined signal stored in a memory in the communication system. A discrete Fourier transform may be applied to predetermined reference values to form transformed reference values. The transformed reference values may be scaled with a set of scaling factors to form scaled. An inverse discrete Fourier transform may be applied to the scaled values to form the reference signal.

A data signal may be received from an output of an analog to digital converter. The data signal may be input to the spectrally constrained impulse shortening filter and the adaptive processor.

In another aspect, a multiple carrier communication system includes a primary impulse shortening filter that receives an output signal of an analog to digital converter and accepts coefficients. A secondary impulse shortening filter receives the output signal of the analog to digital converter, outputs an output signal, and passes coefficients to the primary impulse shortening filter. A reference signal generator outputs a reference signal. A comparator compares the output, signal and the reference signal and outputs a resulting error signal. An adaptive processor computes coefficients for the secondary impulse shortening filter based on the error signal.

Embodiments may include one or more of the following features. A discrete Fourier transform may receive an output signal of the primary impulse shortening filter. A decoder may receive the transformed output signal from the discrete Fourier transform. The reference signal generator may include an encoder that receives output data from the decoder. The reference signal generator may include a scaling filter that scales the output data from the encoder using a set of scaling factors. An inverse discrete Fourier transform may receive the scaled output signal from the scaling filer.

In another aspect, a multiple carrier communication system may include a spectrally constrained impulse shortening filter that receives an output signal of an analog to digital converter and accepts coefficients. A reference signal generator outputs a reference signal. A comparator compares the output signal and the reference signal and outputs a resulting error signal. An adaptive processor computes coefficients for the spectrally constrained impulse shortening filter based on the error signal.

Embodiments may include one or more of the following features. A memory may store the reference signal as a predetermined signal. A discrete Fourier transform may receive the reference signal from the memory. A scaling filter may scale the reference signal using a set of scaling factors. An inverse discrete Fourier transform may receive the scaled reference signal.

Other features and advantages will be apparent from the following detailed description, including the drawings, and from the claims.

DESCRIPTION

Figure 1:
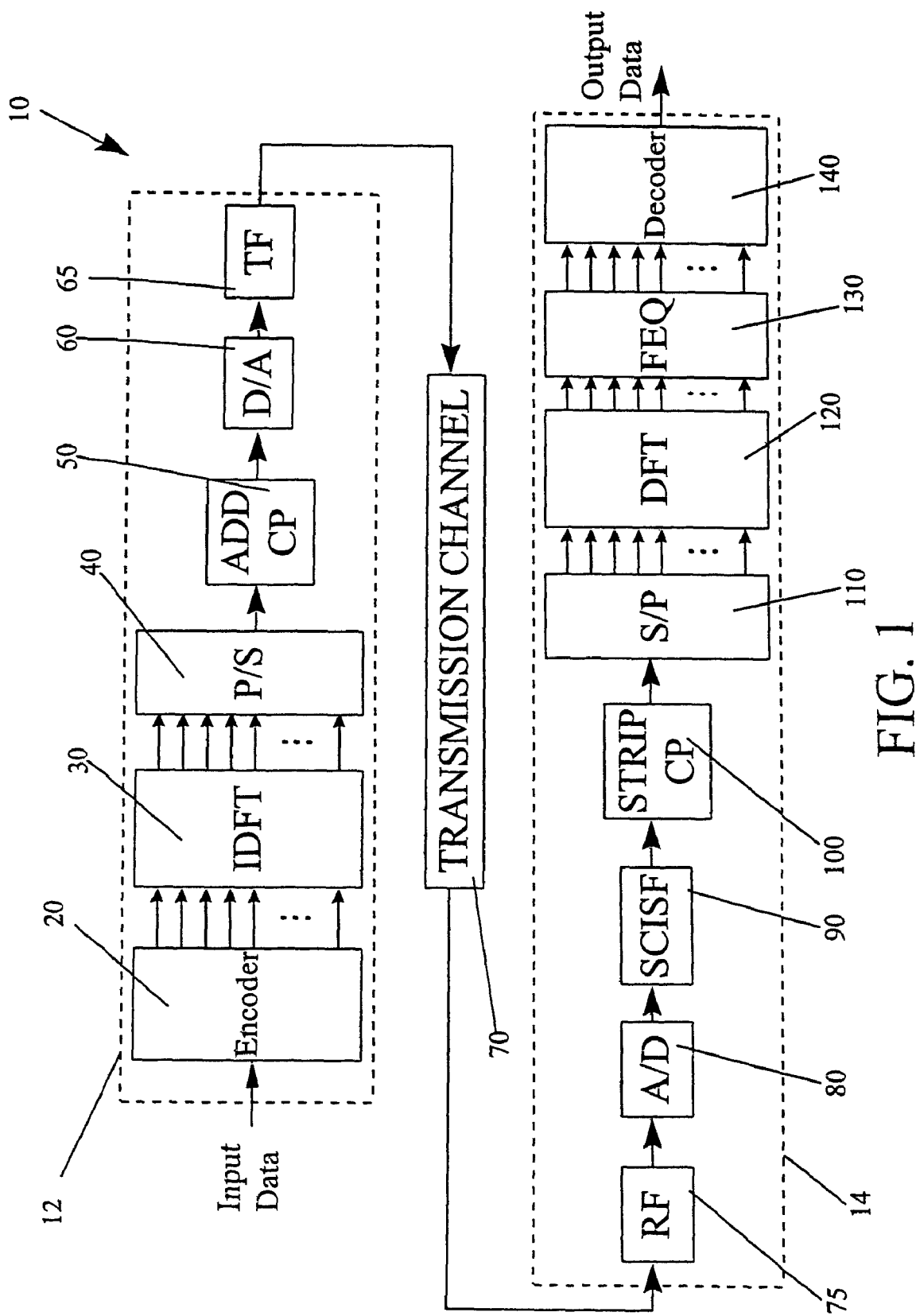
FIG. 1 is a block diagram of a discrete multi-tone communication system with a spectrally constrained impulse shortening filter.

As shown in FIG. 1, a discrete multi-tone (DMT) communication system 10 has a transmitter 12 and a receiver 14. The transmitter 12 accepts an input data bit stream which passes through a constellation encoder 20. The encoder 20 divides the serial input bit stream into blocks of data. These blocks of data are further subdivided into smaller blocks corresponding to subchannels. Each of these smaller blocks are used to compute a complex value representing a constellation point. Each constellation point corresponds to a subsymbol. The subsymbols are then output by the encoder. Taken together, the subsymbols constitute a symbol.

The subsymbols are supplied to an inverse discrete Fourier transform (IDFT) 30, which may be implemented, for example, in a digital signal processor. The IDFT 30 outputs N time samples of a symbol. The time samples are processed by a parallel to serial converter 40 to form a single stream of time samples.

Following the parallel to serial converter 40, a prefix adder 50 adds a cyclic prefix to the beginning of each symbol to reduce intersymbol interference (ISI). Alternatively, the cyclic prefix may be added in the parallel to serial converter. After the cyclic prefix is added, the resulting signal passes through a digital-to-analog (D/A) converter 60 for transmission to the receiver 14 through a communication channel 70. An analog transmit filter 65 may be included following the D/A converter to band limit the transmitted signal.

At the receiver 14, the signal passes through an analog-to-digital (A/D) converter 80 and then through a spectrally constrained impulse shortening filter (SCISF) 90. A prefix stripper 100 strips the cyclic prefixes from the resulting symbols and a serial to parallel converter 110 divides the stream of time samples into parallel signal paths that form the inputs to a discrete Fourier transform (DFT) 120. The DFT 120 converts the time samples into subsymbols. A frequency domain equalization filter 130 equalizes the subsymbols. A decoder 140 converts the subsymbols into a data bits and outputs the resulting data. An analog receive filter 75 may be included prior to the A/D converter in order to band limit the received signal.

As discussed above, a cyclic prefix is added to each symbol prior to transmission through the communication channel to reduce the effects of ISI. The cyclic prefix is added by copying the last v time samples from the end of a symbol and placing them at the beginning of the symbol. To eliminate ISI, the length of the cyclic prefix, v, is chosen to be longer than the effective discrete-time impulse response (EDIR) of the channel. However, because the cyclic prefix constitutes redundant data, increasing the length of the cyclic prefix reduces the efficiency of the communication system. For example, in a system having N time samples per symbol and a cyclic prefix of v time samples, the efficiency of the system will be reduced by a factor of N/(N+v). Efficiency may be maximized either by minimizing v or maximizing N. However, increasing N increases the complexity, latency and computational requirements of the system and at some point becomes impractical. Accordingly, it is desirable to minimize v.

A spectrally constrained impulse shortening filter having an impulse response, g(n), may be employed in the receiver to minimize the length of the cyclic prefix by decreasing the EDIR of the effective communication channel, which includes the transmit and receive filters, the impulse shortening filter, and the physical transmission channel. The use of an impulse shortening filter is referred to as time domain equalization. Decreasing the EDIR allows a shorter cyclic prefix to be used without increasing ISI.

The SCISF may be configured, by determining the filter coefficients during a training or adaptation period. The SCISF filters the output $\{y_k\}$ of the receiver A/D 80. The coefficients are selected using an algorithm that minimizes the squared error between a reference sequence $\{u_k\}$ generated by the receiver and the output of the SCISF $\{\hat{u}_k\}$. The SCISF may be a finite impulse response (FIR) filter or an infinite impulse response (IIR) filter. The SCISF may be trained following activation of the communication system or periodically during operation of the system to compensate for variations in the channel noise profile.

The training may be performed using a variation of one of the classical adaptive algorithms, such as least mean squares (LMS), normalized LMS, or recursive least squares (RLS). For example, the following algorithm is a version of the normalized LMS algorithm in Which $b_0, \ldots, b_N$ and $a_1, \ldots, a_N$ are the FIR and IIR parts of a SCISF having an impulse response, g. The z-transform G(z) is:

$$G(z) = \frac{b_0 + b_1 z^{-1} + \ldots + b_N z^{-N}}{1 - a_1 z^{-1} - \ldots - a_N z^{-N}} \quad (1)$$

The adaptation of coefficients $a_i$ and $b_i$ is defined in the following equations, in which $a_i(k)$ and $b_i(k)$ are the values of these coefficients during the $k^{th}$ iteration. The parameter $\mu$ is a predetermined constant with a value of 0.4.

$$\hat{u}_k = \sum_{i=0}^{N} b_i(k) y_{k-i} + \sum_{j=1}^{N} a_j(k) \hat{u}_{k-j} \quad (2a)$$

$$\alpha_k = [b_0(k), \ldots, b_N(k)] \quad (2b)$$

$$\beta_k = [a_1(k), \ldots, a_N(k)] \quad (2c)$$

$$d_k = [y_k, y_{k-1}, \ldots, y_{k-N}] \quad (2d)$$

$$c_k = [\hat{u}_{k-1}, \hat{u}_{k-2}, \ldots, \hat{u}_{k-N}] \quad (2e)$$

$$e_k \stackrel{\Delta}{=} u_k - \hat{u}_k \quad (2f)$$

$$\alpha_{k+1} = \alpha_k + \mu \frac{e_k d_k}{\|d_k\|^2} \quad (2g)$$

$$\beta_{k+1} = \beta_k + \mu \frac{e_k c_k}{\|c_k\|^2} \quad (2h)$$

Figure 2:
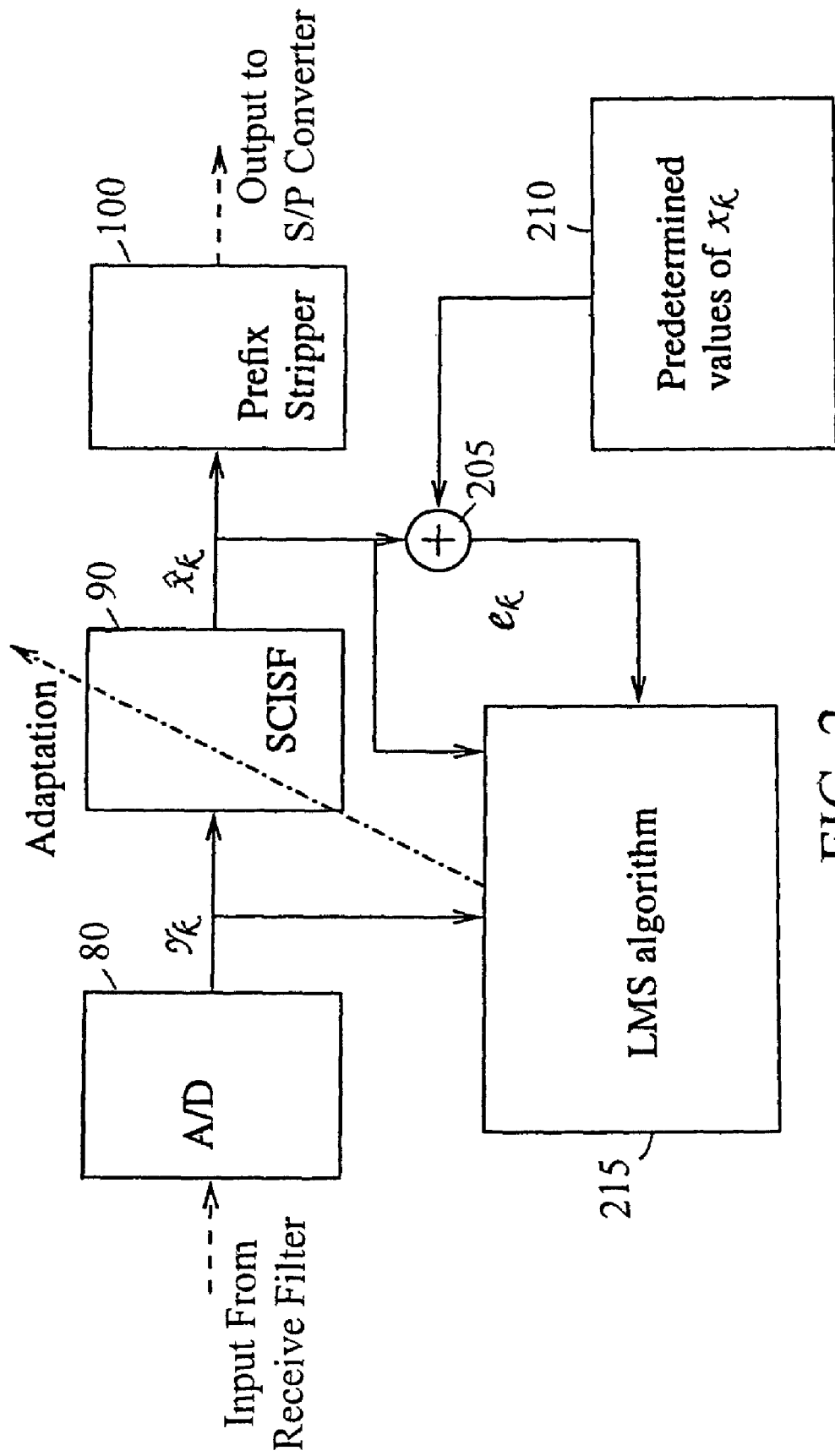
FIG. 2 is a block diagram of a system for adapting a spectrally constrained impulse shortening filter in an initial training process.

In a first embodiment, the coefficients of the SCISF are determined during an initial training period following the activation of the communication system using the LMS algorithm described above. A predetermined sequence of bits $x_k$ is input to the transmitter 12. The sequence of bits results in a sequence of real numbers $\{x_k\}$ at the input of the D/A 60. As shown in FIGS. 1 and 2, the transmitted signal is filtered and noise-corrupted by the transmission channel 70, resulting in a received sequence $\{y_k\}$ at the output of the A/D 80 in the receiver 14. The SCISF 90 filters and transforms the received sequence $\{y_k\}$ into an output sequence $\{\hat{x}_k\}$. The output sequence $\{\hat{x}_k\}$ is compared (in a signal comparator 205) to the predetermined sequence $x_k$, which is stored in memory 210 in the receiver. The comparison results in an error signal $e_k$ that is input to the LMS algorithm processor 215 along with sequence $\{\hat{x}_k\}$.

The training process determines coefficients for the SCISF so that the output matches the predetermined sequence $\{x_k\}$ as closely as possible in a least squares sense, i.e., the mean square error between the output and the predetermined sequence is minimized. During the training process, the coefficients of the SCISF converge to values that enable the SCISF to reduce ISI and additive noise. The resulting SCISF matches $P_1(\omega)$ in the frequency domain in a least squares sense, where:

$$P_1(\omega) = \frac{S_x(\omega)H*(\omega)}{S_x(\omega)|H(\omega)|^2 + S_\eta(\omega)} \quad (3)$$

In the equation above, $S_x(\omega)$ is the power-spectral density at the input of the transmitter D/A 60, $S_\eta(\omega)$ is the power spectral density of the additive noise at the output of the A/D 80, and $H(\omega)$ is the frequency response of the effective discrete-time impulse response (EDIR) of the transmission channel 70, transmit filter 65, and receive filter 75 measured between the input of the transmitter D/A 60 and the output of the receiver A/D 80.

Upon completion of the initial training of the SCISF, the SCISF coefficients are fixed and the frequency domain equalizer (FEQ 130) of the receiver is trained using standard techniques for DMT receivers. Following the training of the FEQ, the SCISF can be periodically trained or adapted during operation of the communication system. Since it is not efficient to repeatedly transmit a predetermined bit sequence during operation of the communication system, the periodic training process uses transmitted communication data to generate the reference and output sequences, as described below.

Figure 3A:
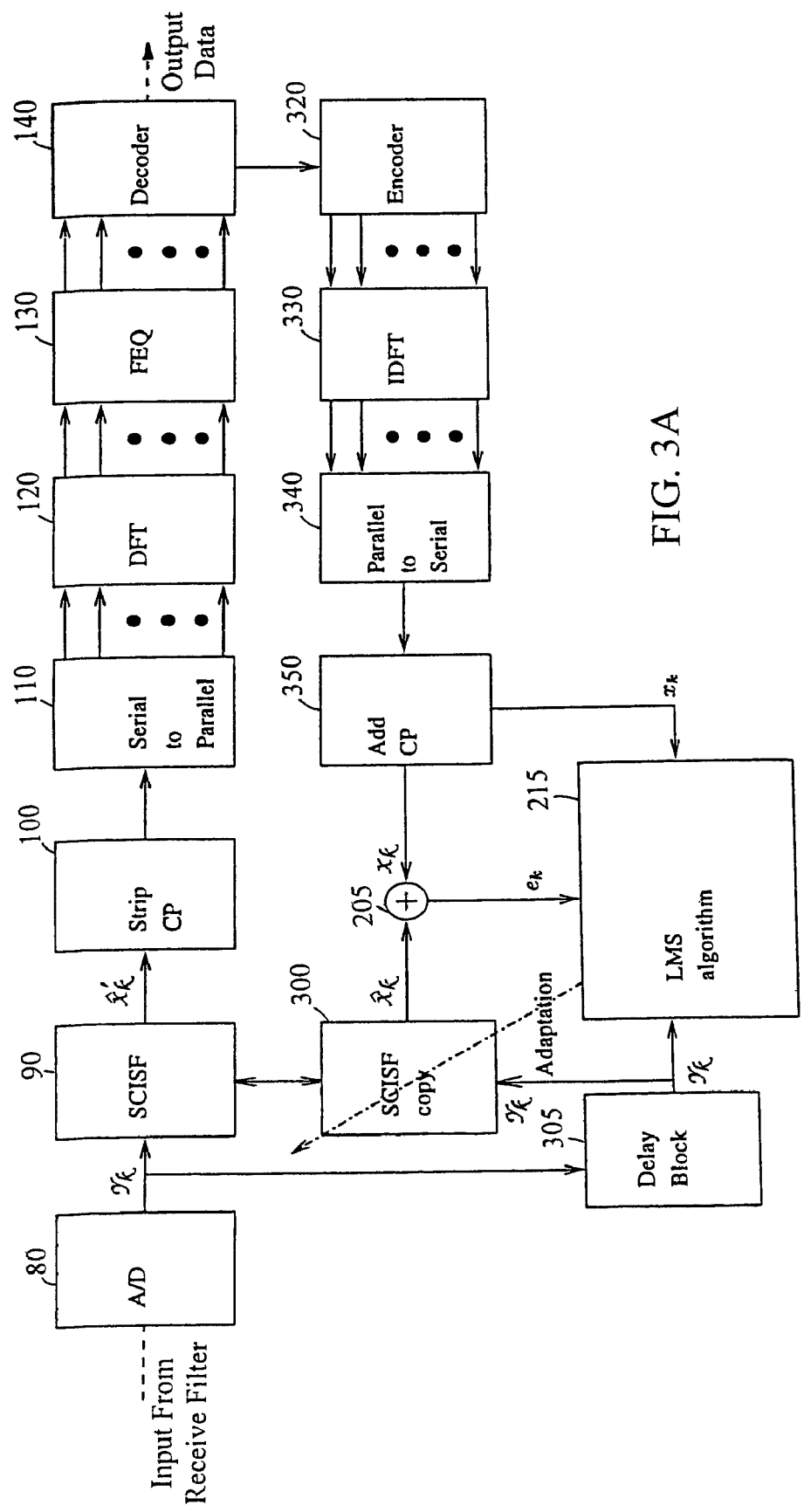
FIGS. 3A and 3B are block diagrams of a system for adapting a spectrally constrained impulse shortening filter in an periodic or continuous training process.

During operation of the communication system, a sequence of communication data bits $x_k$ is input to the transmitter 12 (see FIG. 1). The sequence of data bits results in a sequence of real numbers $\{x_k\}$ at the input of the D/A 60. As shown in FIGS. 1 and 3A, the transmitted signal is filtered and noise-corrupted by the transmission channel 70, resulting in a received sequence $\{y_k\}$ at the output of the A/D 80 in the receiver 14. The SCISF 90 filters and transforms the received sequence $\{y_k\}$ into an output sequence $\{\hat{x}'_k\}$.

The received sequence $\{y_k\}$ is also input to a delay 305 and then to a secondary SCISF 300 that has the same coefficients as the primary SCISF 90 following the initial training. Such a configuration allows periodic training to be performed without disruption to the operation of the communication system. The secondary SCISF 300 is periodically or continuously trained using an algorithm similar to that used for the initial training. The new coefficients of the secondary SCISF 300 are periodically copied to the primary SCISF 90.

In an initial training process, the output sequence $\{\hat{x}_k\}$ of the secondary SCISF 300 would be compared (in a signal comparator 205) to a predetermined sequence $x_k$ stored in memory. However, as discussed above, a sequence of data communication bits is used as a reference sequence for training rather than a predetermined sequence. As such, the receiver must have a way of generating a reference signal to compare to the output of the SCISF.

To compute the reference sequence, the receiver essentially duplicates the encoding and modulation processes of the transmitter using the output of the decoder 140. Because the initial training has already been performed, the SCISF 90 output $\{\hat{x}'_k\}$ matches the predetermined sequence $\{x_k\}$ closely and ISI and additive noise are minimized. Hence, the data output of the decoder 140 closely matches the transmitted sequence of communication data bits $x_k$. The data bits are input to an encoder 320, an IDFT 330, a parallel to serial converter 340, and a prefix adder 350 similar to those in the transmitter. The output sequence $\{x_k\}$ of this chain is input to the LMS algorithm processor 215 and used as a reference sequence in the training algorithm.

The output sequence $\{\hat{x}_k\}$ of the secondary SCISF 300 is compared (in a signal comparator 205) to the reference sequence $\{x_k\}$, which is output by the encoding/modulation chain (320, 330, 340 and 350). As noted above, the received sequence $\{y_k\}$ passes through a delay 305 before being input to the secondary SCISF 300. The delay 305 compensates for the processing delay in the demodulation/decoding chain and the encoding/modulation chain. The comparison results in an error signal $e_k$ that is input to the LMS algorithm processor 215. The training process, determines coefficients for the secondary SCISF 300 so that the output $\{\hat{x}_k\}$ matches the reference sequence $\{x_k\}$ as closely as possible in a least squares sense, i.e., the mean square error between the output and the reference sequence is minimized. Periodically, the coefficients of the secondary SCISF 300 are copied to the primary SCISF 90.

Figure 3B:
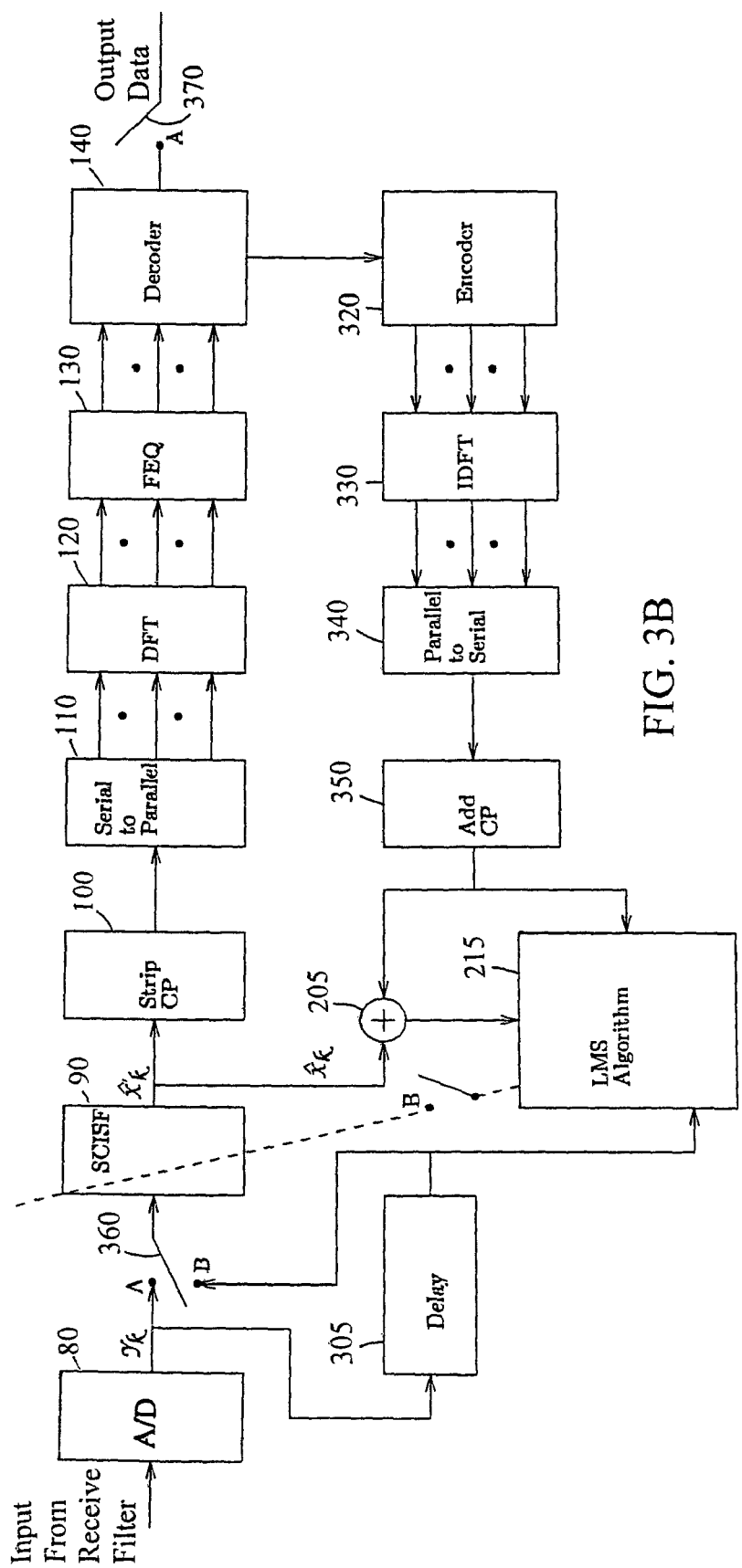

Alternatively, as shown in FIG. 3B, the periodic training may be performed with a single SCISF 90. In this configuration, a received sequence $\{y_k\}$ is output by the A/D 80 in the receiver, 14. The SCISF 90 filters and transforms the received sequence $\{y_k\}$ into an output sequence $\{\hat{x}'_k\}$. The received sequence $\{y_k\}$ is also input to a delay 305. After the received sequence $\{y_k\}$ passes through the SCISF 90, a data switch 360 is changed from position A to position B, allowing the delayed received sequence to make a second pass through the SCISF 90. An output switch 370 also may be opened, so that data is not output during the training process. In addition, the SCISF coefficients are controlled by the LMS algorithm during the training process.

A reference sequence is computed, as in the configuration of FIG. 3A. The data bits are input to an encoder 320, an IDFT 330, a parallel to serial converter 340, and a prefix adder 350. The resulting reference sequence $\{x_k\}$ is input to the LMS algorithm processor.

The output sequence $\{\hat{x}_k\}$ of the second pass through the SCISF 90 is compared (in signal comparator 205) to the reference sequence. As noted above, the received sequence $\{y_k\}$ passes through a delay 305 before being input to the SCISF 90 for the second pass. The delay 305 compensates for the processing delay in the demodulation/decoding chain and the encoding/modulation chain. The comparison results in an error signal $e_k$ that is input to the LMS algorithm processor 215. The training process determines coefficients for the SCISF 90 so that the output $\{\hat{x}_k\}$ matches the reference sequence $\{x_k\}$ as closely as possible in a least squares sense, i.e., the mean square error between the output and the reference sequence is minimized. The coefficients of the SCISF 90 then are updated to the coefficients determined in the training process.

In a second embodiment, the SCISF 90 coefficients are chosen so that the frequency response of the SCISF matches a desired spectral response $G_d(\omega)$ that seeks to minimize the effects of noise-bleeding and maximize system bit throughput. The desired spectral response $G_d(\omega)$ is determined based on the signal-to-noise ratios observed in the various frequency bins of the DFT 120 in the receiver.

For example, an OFDM system may have M tones, N of which ($m_1$ through $m_N$) are used. The system operates over a channel with analog frequency response $H_c(f)$. Referring again to FIG. 1, the analog noise power spectral density at the input of the receiver A/D 80 is $S_\eta(f)$. Prior to receiver A/D 80, the received analog signal may be filtered by an anti-aliasing filter (i.e., receive filter 75) having a transfer function $H_a(f)$. The effective discrete-time impulse response (EDIR) of the transmission channel of the OFDM system (including the transmit filter 65 and receive filter 75) is $h(n)$. The output of the A/D 80 is input to a SCISF 90 having an impulse response $g(n)$. $G(\omega)$ is the spectral response corresponding to $g(n)$.

The expected signal energy μ(k) observed in frequency bin k at the output of the DFT 120, which has a length of NM, is:

$$\mu(k) = C_1 D_k \left|H\left(\frac{\pi k}{M}\right)\right|^2 \left|G\left(\frac{\pi k}{M}\right)\right|^2; \quad H(\omega) = H_c\left(\frac{\omega}{2\pi T}\right) H_a\left(\frac{\omega}{2\pi T}\right) \quad (4)$$

where $C_1$ is a constant, 1/T is the sampling frequency and $D_k$ is the transmitted power in frequency bin k. The noise power η(k) in bin k is:

$$\eta(k) = C_2 \left[ S_\eta\left(\frac{\omega}{2\pi T}\right) |G(\omega)|^2 \left|H_a\left(\frac{\omega}{2\pi T}\right)\right|^2 \right] * \left[ \frac{\sin^2(M\omega)}{\sin^2\left(\frac{\omega}{2}\right)} \right]\Bigg|_{\omega=\frac{\pi k'}{M}} \quad (5)$$

where $C_2$ is a constant and * denotes a convolution of the discrete Fourier transforms. If the noise in the bands occupied by unused tones is sufficiently attenuated by the anti-alias filter (receive filter 75), η(k) is approximately:

$$\eta(k) \approx \quad (6)$$

$$C_3 \sum_{i=M_1}^{M_2} S_\eta\left(\frac{l}{2MT}\right) \left|G\left(\frac{\pi l}{M}\right)\right|^2 \left|H_a\left(\frac{l}{2MT}\right)\right|^2 (\tau(k-l) + \tau(2M-k-l))$$

where τ(n) is defined as:

$$\tau(n) = \int_{-\frac{\pi}{NM}}^{\frac{\pi}{NM}} \left[ \frac{\sin^2\left(M\left(\frac{\pi n}{M} - \lambda\right)\right)}{\sin^2\left(\frac{1}{2}\left(\frac{\pi n}{M} - \lambda\right)\right)} \right] d\lambda, \quad (7)$$

$m_1 \ldots m_N$ are the used tones, and $C_3$ is a constant. A vector of frequency magnitudes g is defined as:

$$g \triangleq \begin{bmatrix} \left|G\left(\frac{\pi m_1}{M}\right)\right|^2 \\ \vdots \\ \left|G\left(\frac{\pi m_N}{M}\right)\right|^2 \end{bmatrix} = \begin{bmatrix} G_1 \\ \vdots \\ G_N \end{bmatrix} \quad (8)$$

The SNR in frequency bin k is $$\frac{r_k G_k}{s_k^T g}$$

for scalars $r_k$ and vectors $s_k$. The scalars $r_k$ are defined by:

$$r_k \triangleq C_1 D_k \left|H\left(\frac{\pi k}{M}\right)\right|^2 \quad (9)$$

and $s_k(l)$, the lth component of $s_k$ is defined by:

$$s_k(l) = C_3 S_\eta\left(\frac{l}{2MT}\right) \left|H_a\left(\frac{l}{2MT}\right)\right|^2 (\tau(k-l) + \tau(2M-k-l)) \quad (10)$$

To determine an expression for g that maximizes system bit throughput, the capacity of each frequency bin k is approximated by $\log(1+SNR_k)$. Accordingly, the optimal spectral profile is determined by minimizing the cost function F, where:

$$F(g) = -\sum_{k=m_1}^{m_N} \log\left(1 + \frac{r_k G_k}{s_k^T g}\right) \quad (11)$$

Since $G_k = |G(\pi m_k/M)|^2$, the minimization of the cost function is performed over all positive values of $G_k$, as:

$$g_{opt} = \arg\min_{g \in G} F(g) \quad (12)$$

where:

$$G = \{g \in R^N : \|g\| = 1, G_i \geq 0, 1 \leq i \leq N\} \quad (13)$$

A variety of constrained optimization strategies may be used to solve the above equations for $g_{opt}$.

Figure 4:
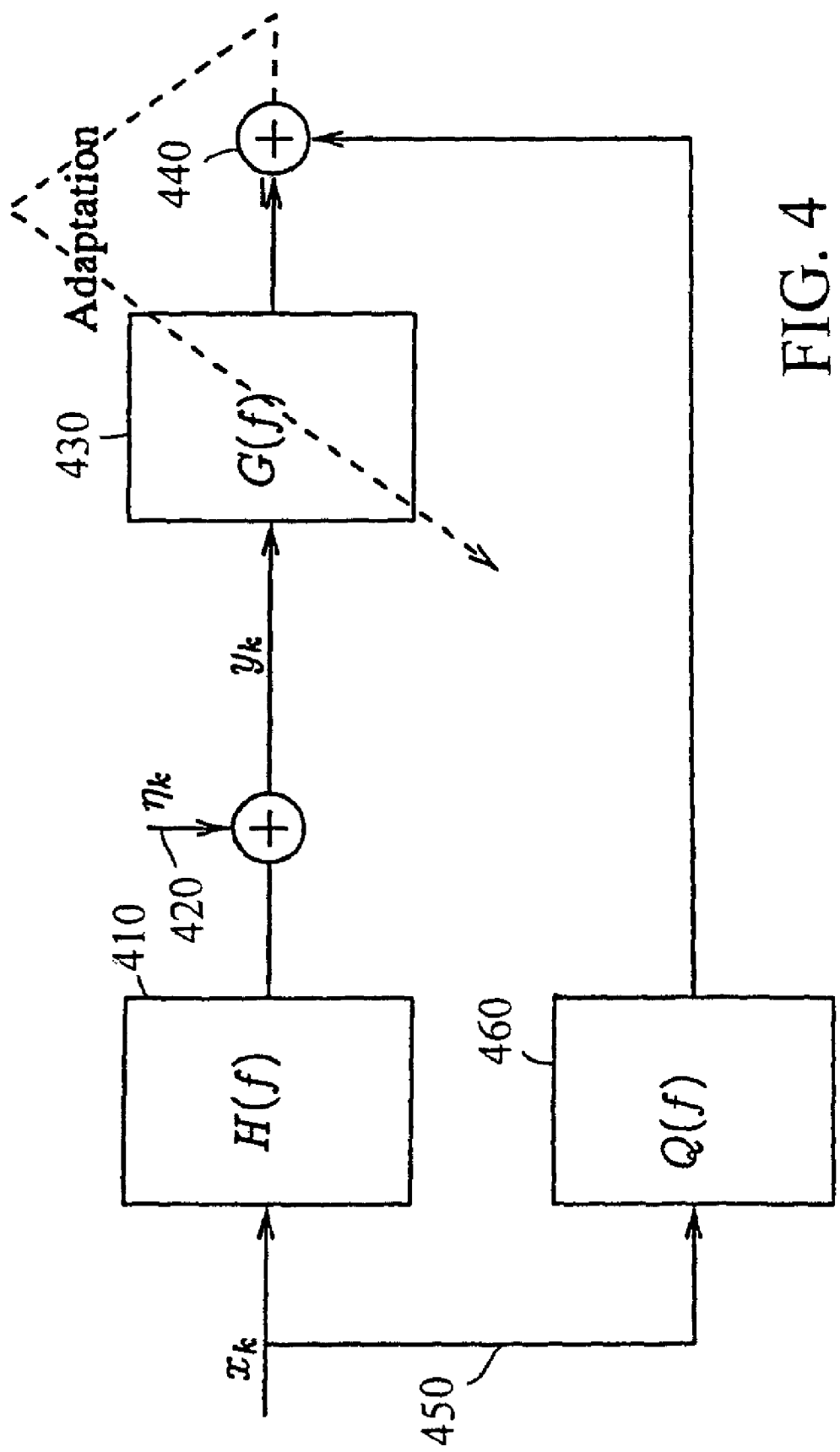
FIG. 4 is a block diagram of a generalized adaptation system that employs frequency scaling in the feedback loop.

Once the optimal impulse response $g_{opt}$ and desired spectral response $G_d(\omega)$ (which may be expressed as $G_d(\pi m_k/M)$ for a system having M tones) have been determined, a training process is used to adapt the SCISF 90 so that its impulse response g matches the desired spectral response. As shown in FIG. 4, the training process may be generalized as a feedback system. A reference sequence $x_k$ is input to the system. This corresponds to inputting a predetermined reference bit sequence to a transmitter. The reference sequence passes through a transmission channel 410 having frequency response H(f) (including the physical transmission channel and the transmit and receive filters). Additive noise $\eta_k$ from the transmission channel is represented in this general model as an external input 420 to the system. The resulting signal $y_k$ is input to a filter 430 having a frequency response G(f), e.g., a SCISF. The output of the filter 430 is then passed to an adaptation processor 440, which computes an error signal based on the feedback loop 450 and adapts the filter accordingly. The adaptation processor may, for example, use the LMS algorithm described above.

The reference sequence $x_k$ is also input to the feedback loop 450, which passes the reference sequence $x_k$ through a scaling filter 460 with frequency characteristic Q(f). The frequency characteristic Q(f) of the scaling filter 460 (which may be expressed as a set of frequency domain scaling factors $Q_k$) is determined so that the SCISF adapts to the desired spectral response. The output of the scaling filter 460 is used a reference for the calculation of the error signal in the adaptation processor 440, as described above.

Using the general feedback system shown in FIG. 4, a SCISF having an impulse response g may be trained to minimize the error $\|q*x - x*g*h - \eta*g\|^2$. The resulting filter matches $P_2(\omega)$ in the frequency domain in a least-squares sense, where:

$$P_2(\omega) = \frac{S_x(\omega)H^*(\omega)Q(\omega)}{S_x(\omega)|H(\omega)|^2 + S_\eta(\omega)}, \quad (14)$$

$S_x(\omega)$ is the power-spectral density at the input of the system, $H(\omega)$ is the frequency response of the effective discrete-time impulse response (EDIR) of the transmission channel, $S_\eta(\omega)$ is the power spectral density of the additive noise, and $Q(\omega)$ is the spectral response of the scaling filter 460 having impulse response q.

The solution for $g_{opt}$ in the equations above specifies only the magnitude of the spectral response of the SCISF. If the SCISF is a FIR filter, a linear phase characteristic may be used. If the length of the SCISF is $n_g$, the desired values of $G(\omega)$ for the frequency bins of interest are:

$$G_d(\pi M_k/M) \triangleq \sqrt{g_{opt}(k)} \exp\left(\frac{-j\pi M_k(n_g - 1)}{2M}\right). \quad (15)$$

The values $Q_k$ are defined by:

$$Q_k = \frac{G_d(\pi m_k/M)(S_x(j\pi k/M)|H(j\pi k/M)|^2 + S_\eta(j\pi k/M))}{S_\eta(j\pi k/M)H*(j\pi k/M)} \quad (16)$$

The values of $Q_k$ may be computed during an initial training period and may be periodically updated during operation of the communication system.

Figure 5:
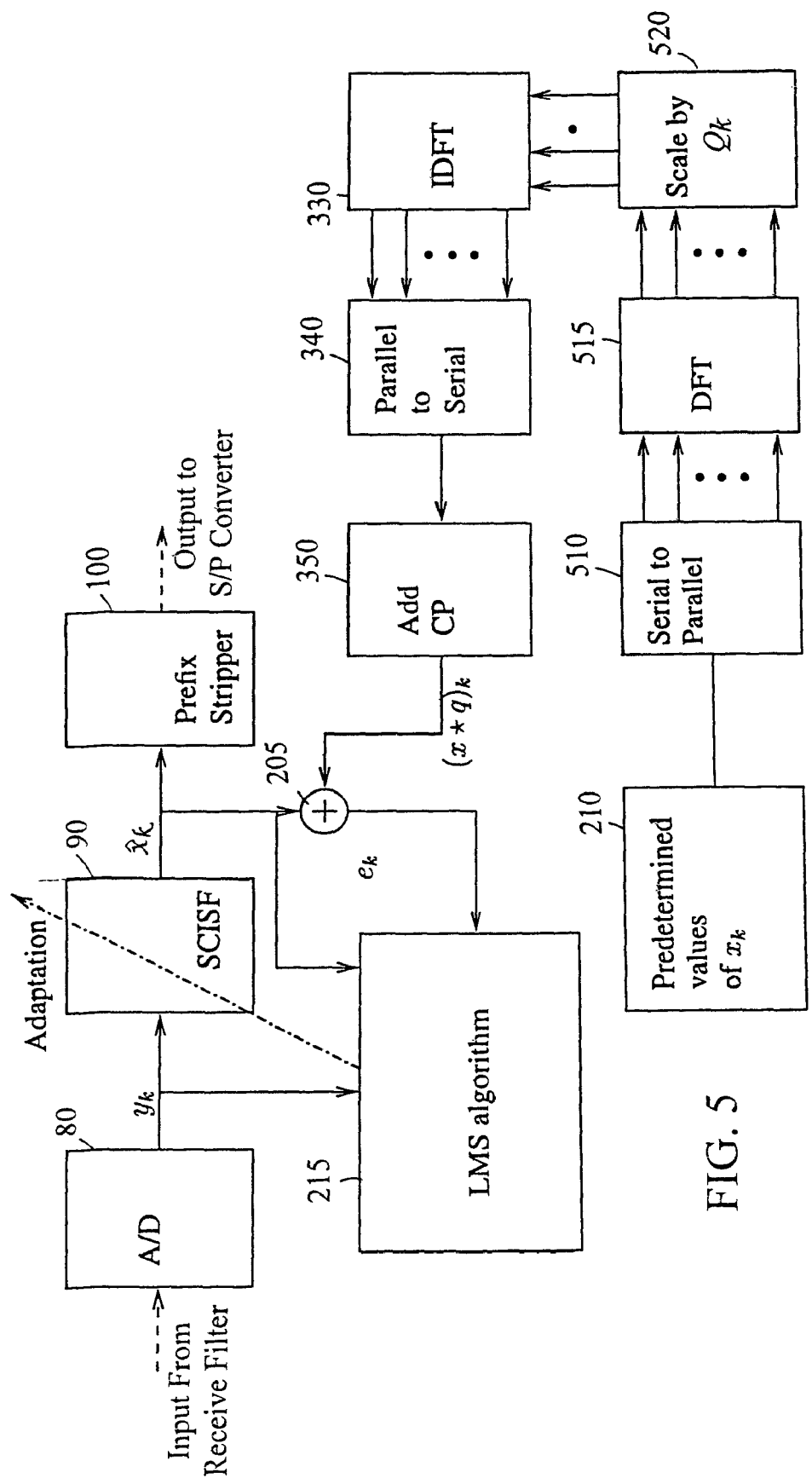
FIG. 5 is a block diagram of a system for adapting a spectrally constrained impulse shortening filter in an initial training process that includes frequency scaling in the feedback loop.
Figure 6A:
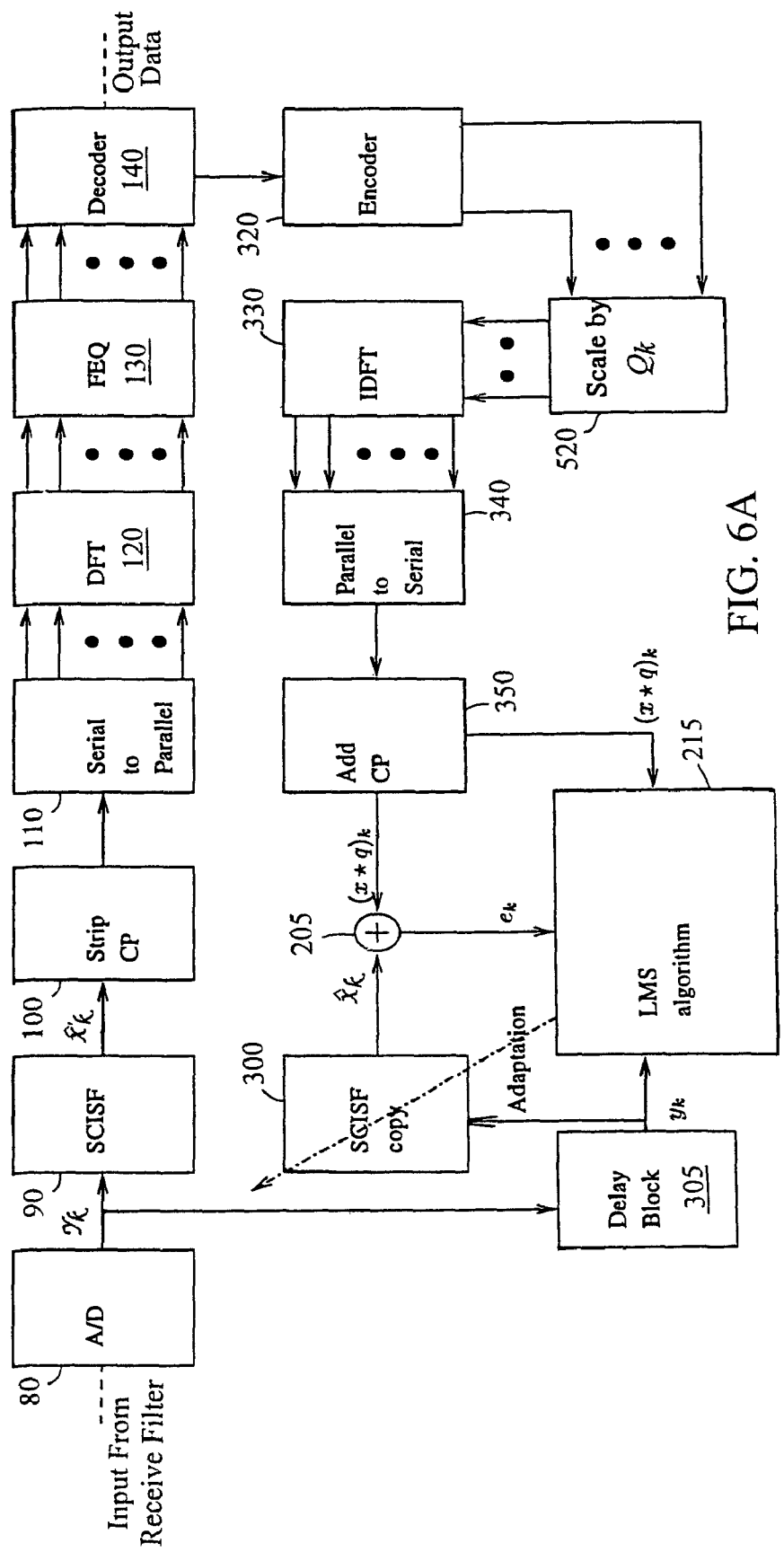
FIGS. 6A and 6B are block diagrams of a system for adapting a spectrally constrained impulse shortening filter in an periodic or continuous training process that includes frequency scaling in the feedback loop.
Figure 6B:
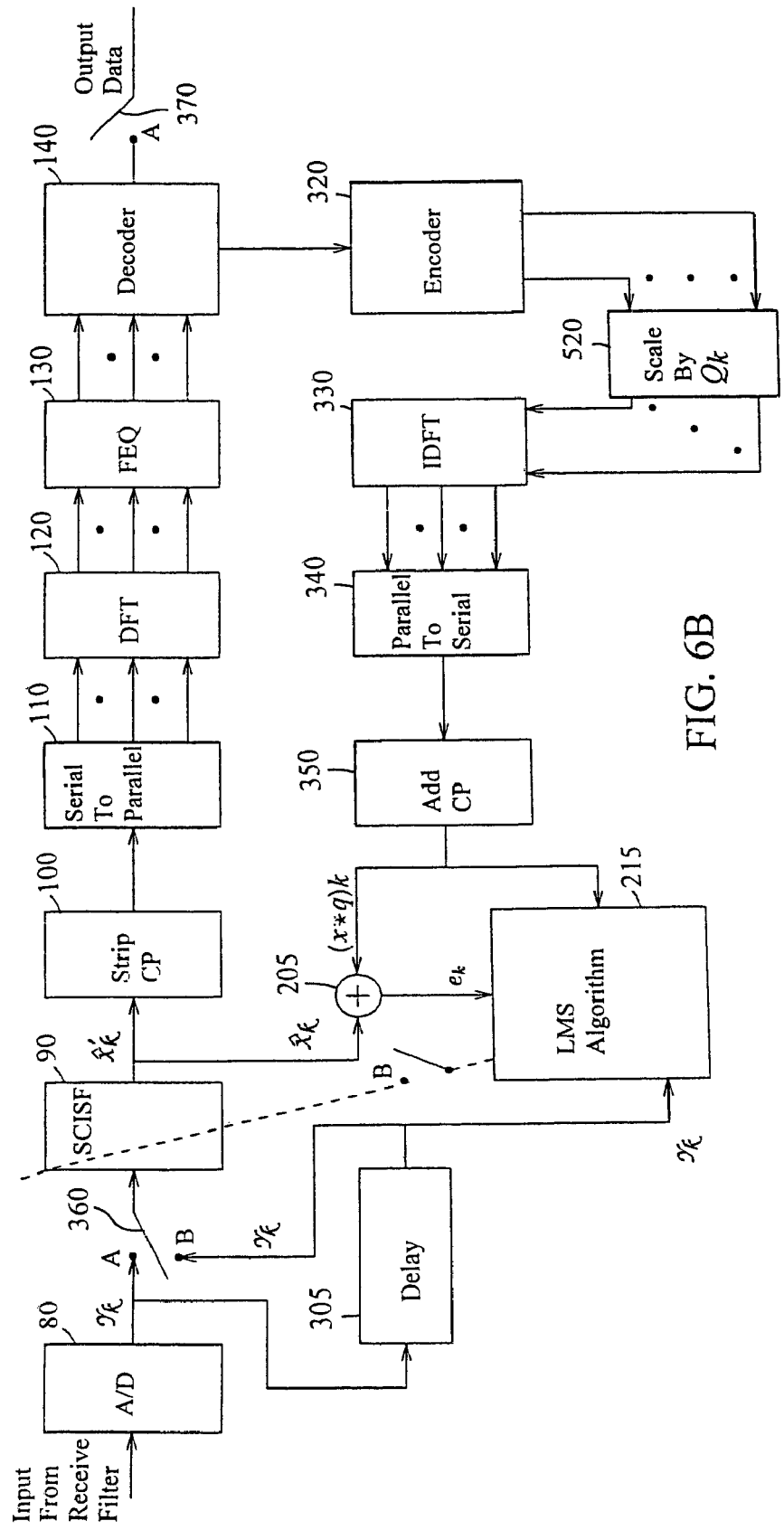

As shown in FIGS. 5, 6A and 6B, the general feedback training process may be used to perform an initial training of a SCISF followed by periodic training analogous to the process described above with respect to FIGS. 1-3. One difference between the techniques is that a scaled reference signal $(x*q)_k$ is used rather than an unscaled reference $x_k$.

Referring to FIG. 5, to perform the initial training, a predetermined sequence of bits $x_k$ is input to the transmitter. The transmitted signal is filtered and noise-corrupted by the transmission channel, resulting in a received sequence $\{y_k\}$ at the output of the A/D 80 in the receiver. The SCISF 90 filters and transforms the received sequence $\{y_k\}$ into an output sequence $\{\hat{x}_k\}$. The output sequence $\{\hat{x}_k\}$ is compared (in a signal comparator 205) to a scaled reference sequence $(x*q)_k$.

The scaled reference sequence is computed from a copy of the predetermined sequence $x_k$ that is stored in memory 210 in the receiver. As a first step, the predetermined sequence is input to a serial to parallel converter 510 and a DFT 515. The resulting frequency domain signal is input to a scaling filter 520 which applies the set of frequency domain scaling factors $Q_k$ that causes the SCISF to adapt to the desired spectral response, as discussed above. The scaled signal is input to an inverse discrete Fourier transform 330, a parallel to serial converter 340 and a cyclic prefix adder 350, resulting in a scaled reference sequence $(x*q)_k$. The comparison of the output sequence $\{\hat{x}_k\}$ to the scaled reference sequence $(x*q)_k$ results in an error signal $e_k$ that is input to the LMS algorithm processor 215 along with sequence $\{\hat{x}_k\}$. Alternatively, a frequency domain reference (e.g., a predetermined bit sequence that has been processed by a serial to parallel converter and DFT) may be stored in memory in the receiver, which would eliminate the need for the serial to parallel converter and discrete Fourier transform in the feedback loop.

Following the initial training, the SCISF is periodically trained during operation of the communication system. A sequence of communication data bits $x_k$ is input to the transmitter. Referring to FIG. 6A, the transmitted signal is filtered and noise-corrupted by the transmission channel, resulting in a received sequence $\{y_k\}$ at the output of the A/D 80 in the receiver. The SCISF 90 filters and transforms the received sequence $\{y_k\}$ into an output sequence $\{\hat{x}'_k\}$.

The received sequence $\{y_k\}$ is also input to a delay 305 and then to a secondary SCISF 300 that has the same coefficients as the primary SCISF 90 following the initial training. The secondary SCISF 300 provides output sequence $\{\hat{x}_k\}$, which is compared to a reference sequence during the periodic training process. Such a configuration allows periodic training to be performed without disruption to the operation of the communication system. The secondary SCISF 300 is periodically or continuously trained using an algorithm similar to that used for the initial training. The new coefficients of the secondary SCISF 300 are periodically copied to the primary SCISF 90.

To compute the reference sequence, the data output of the decoder 140 is input to an encoder 320. The resulting frequency domain signal is input to a scaling filter 520 which applies the set of frequency domain scaling factors $Q_k$ that causes the SCISF to adapt to the desired spectral response, as discussed above. The scaled signal is input to an inverse discrete Fourier transform 330, a parallel to serial converter 340 and a cyclic prefix adder 350, resulting in a scaled reference sequence $(x*q)_k$. The comparison of the output sequence $\{\hat{x}_k\}$ to the scaled reference sequence $(x*q)_k$ results in an error signal $e_k$ that is input to the LMS algorithm processor 215. The training process determines coefficients for the secondary SCISF 300 so that the output $\{\hat{x}_k\}$ matches the scaled reference sequence $(x*q)_k$ as closely as possible in a least squares sense, i.e., the mean square error between the output and the reference sequence is minimized. Periodically, the coefficients of the secondary SCISF 300 are copied to the primary. SCISF 90.

Alternatively, as shown in FIG. 6B, the periodic training may be performed with a single SCISF 90. In this configuration, a received sequence $\{y_k\}$ is output by the A/D 80 in the receiver. The SCISF 90 filters and transforms the received sequence $\{y_k\}$ into an output sequence $\{\hat{x}'_k\}$. The received sequence $\{y_k\}$ is also input to a delay. After the received sequence $\{y_k\}$ passes through the SCISF 90, a data switch 360 is changed from position A to position B, allowing the delayed received sequence to make a second pass through the SCISF 90. An output switch 370 also may be opened, so that data is not output during the training process. In addition, the SCISF coefficients are controlled by the LMS algorithm during the training process.

A reference sequence is computed as in the configuration of FIG. 6A. The data output of the decoder 140 is input to an encoder 320. The resulting frequency domain signal is input to a scaling filter 520 which applies the set of frequency domain scaling factors $Q_k$ that causes the SCISF to adapt to the desired spectral response, as discussed above. The scaled signal is input to an inverse discrete Fourier transform 330, a parallel to serial converter 340 and a cyclic prefix adder 350, resulting in a scaled reference sequence $(x*q)_k$. The scaled reference sequence is input to the LMS algorithm processor.

The output sequence $\{\hat{x}_k\}$ of the second pass through the SCISF 90 is compared (in signal comparator 205) to the reference sequence $(x*q)_k$. As noted above, the received sequence $\{y_k\}$ passes through a delay 305 before being input to the SCISF 90 for the second pass. The delay 305 compensates for the processing delay in the demodulation/decoding chain and the encoding/modulation chain. The comparison results in an error signal $e_k$ that is input to the LMS algorithm processor 215. The training process determines coefficients for the SCISF 90 so that the output $\{\hat{x}_k\}$ matches the scaled reference sequence $(x*q)_k$ as closely as possible in a least squares sense, i.e., the mean square error between the output and the reference sequence is minimized. The coefficients of the SCISF 90 then are updated to the coefficients determined in the training process.

In a third embodiment, the system dynamically selects the length of the cyclic prefix (CP) to maximize data throughput for a communication channel having a particular noise profile. As discussed above, a CP is added to each symbol prior to transmission through the communication channel to reduce the effects of ISI. However, because the CP constitutes redundant data, increasing the length of the CP reduces the efficiency of the communication system. Hence, to maximize efficiency, the length of the CP must be as short as the noise characteristics of the communication channel permit.

For a DMT communication system with M tones, the maximum sample rate W (samples/second) for a particular channel depends, in part, on the available bandwidth and hardware limitations. The sample rate includes communication data and CP bits. For a CP length of $n_c$, the maximum symbol rate (which includes communication data, but not the CP) is $W/(2M+n_c)$.

Before determining the optimal CP length, the SCISF should be initially trained to the channel. However, a communication system need not have a SCISF to employ the CP optimization algorithm. It is noted that the SCISF coefficients determined during the training process do not depend on the CP length. The capacity of the sub-channel may be approximated as $\log(1+SNR_i)$ bits per second, so the number of bits per symbol is $\Sigma_i \log(1+SNR_i)$. For a CP length of $n_c$, the maximum bit rate is expressed as a function of the cyclic prefix as:

$$B_a(n_c) = \frac{W \sum_i \log(1 + SNR_i)}{2M + n_c} \quad (17)$$

The optimal CP length is determined by computing the maximum bit rate for a set of candidate values of CP length and finding the length that maximizes $B_a(n_c)$.

The signal to noise ratio $SNR_i$ of each subchannel is determined by measuring the received signal and noise power and computing the ratio of the two. The noise power $\gamma_i$ for the $i^{th}$ bin may be measured by transmitting a data communication sequence and computing the average of the squares of the errors measured at the output of the receiver DFT. The total received power (signal and noise) $\delta_i$ for the $i^{th}$ bin may be measured by computing the average of the squares of the outputs of the receiver DFT. The signal to noise ratio is determined from the expression: $\delta_i/\gamma_i = 1+SNR_i$. Since the signal to noise ratio is determined in the receiver, the computed bit rate $B_a(n_c)$ must be transmitted back to the transmitter. The transmitter compares the bit rate to the value's computed for other candidate CP lengths and selects the CP length $n_c$ with the highest maximum bit rate $B_a(n_c)$.

FIGS. 7A-7D and 8A-8D show performance simulations for test systems based on system parameters and test loops described in *VDSL Alliance SDMT VDSL Draft Standard Proposal*, Technical report, ANSI, 1998; and *Very-high-speed digital subscriber lines: System requirements*, T1E1.4/97-131R1, Technical report, ANSI, 1997. The results are for a VDSL system working over test loops 2 and 6 of length 4500 feet in the upstream direction. The system has a sampling frequency of 11.04 MHz. Noise is generated by near-end cross talk from an interfering ADSL and an interfering HDSL and white noise at a level of −140 dBm. The SCISF used in the simulations is length-15 FIR. A version of the Normalized LMS algorithm is used to train the SCISF during an initial training period using a predetermined transmitted sequence.

Figure 7A:
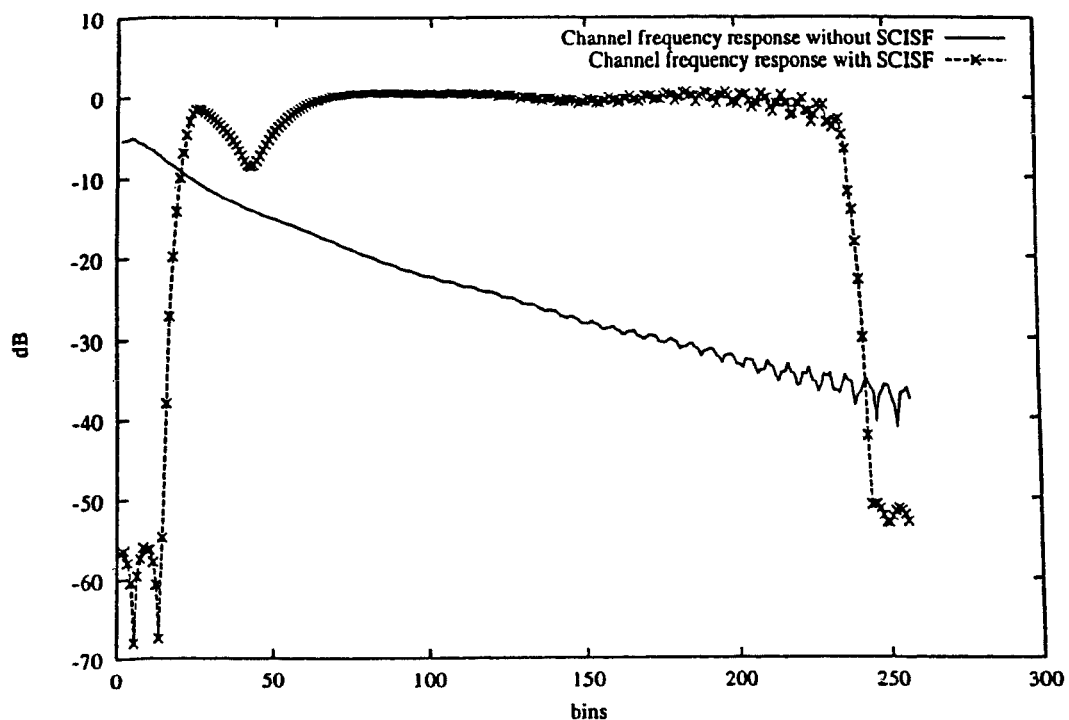
FIGS. 7A-7D are plots of simulation results for a discrete multi-tone system.
Figure 7B:
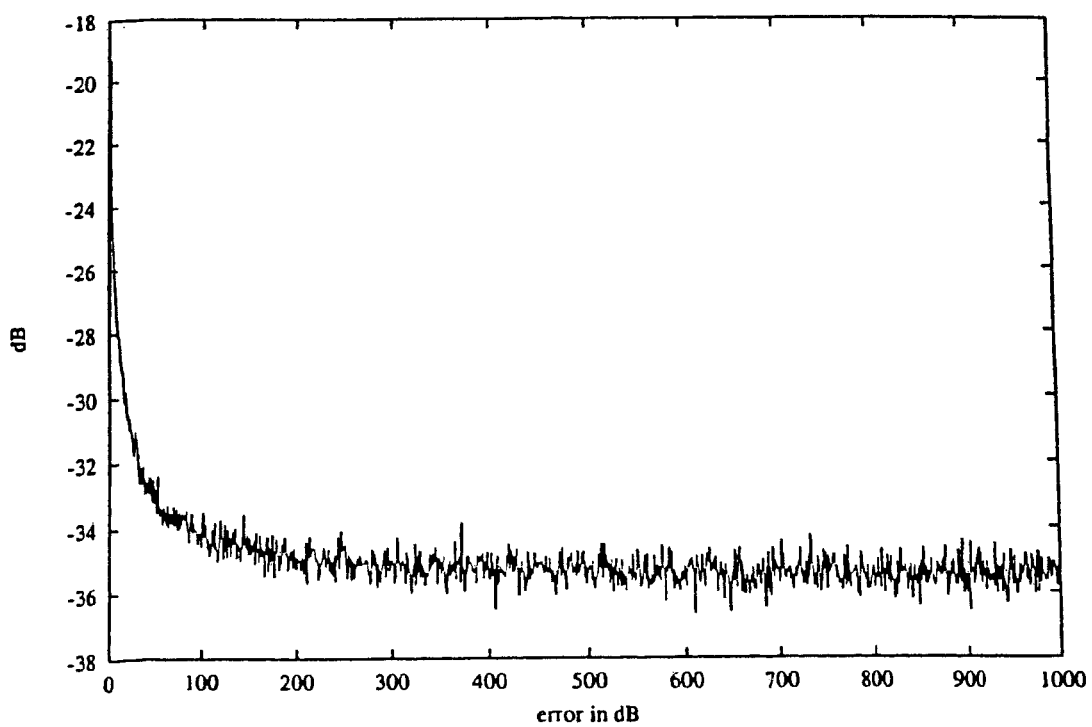
Figure 7C:
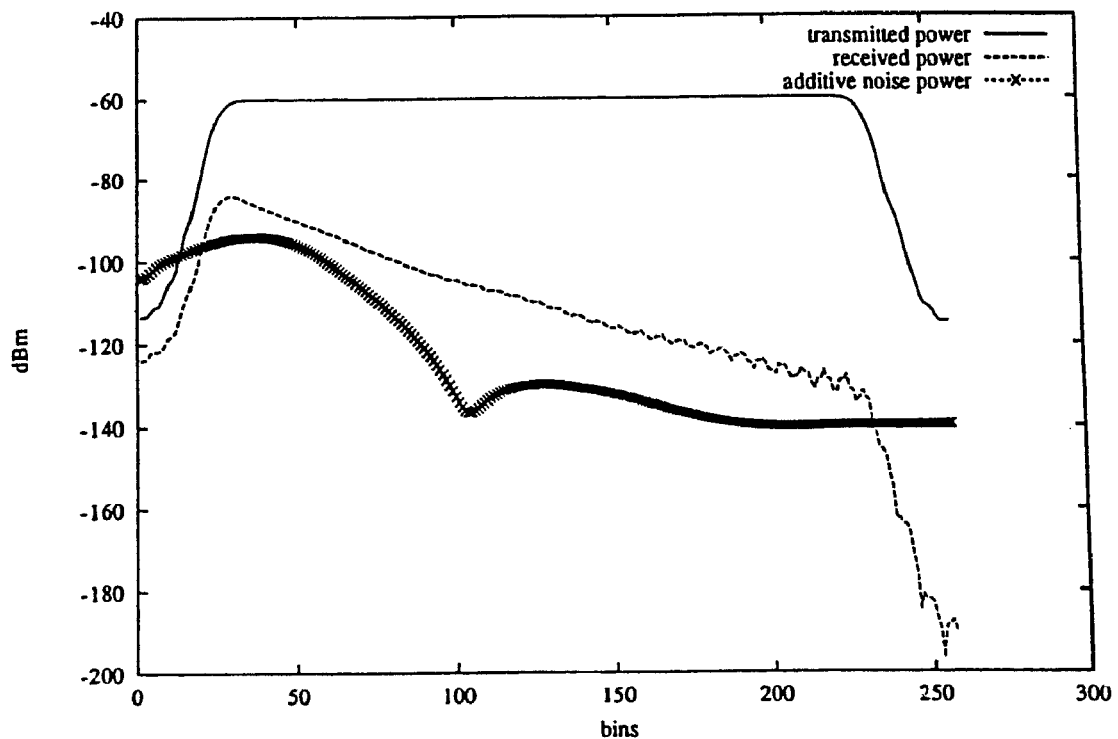
Figure 7D:
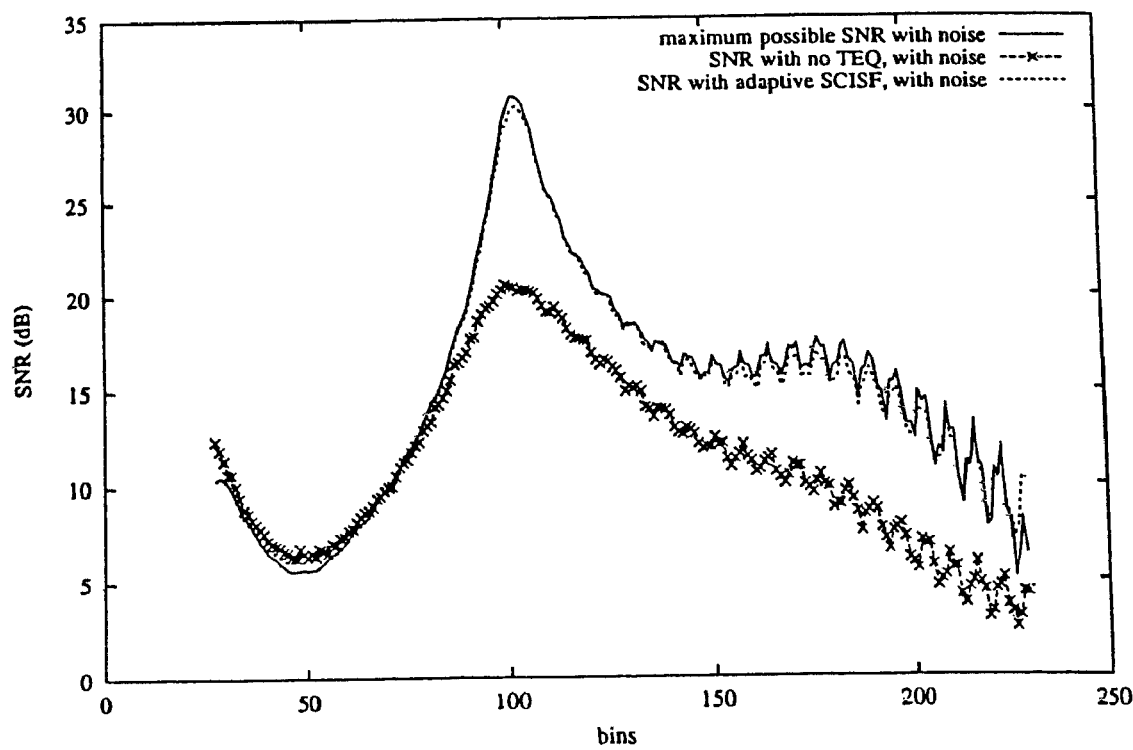

FIGS. 7A-7D show the simulated system performance for a communication system having the parameters defined for Test Loop 2, which is 4500, feet in length. FIG. 7A shows channel frequency response with and without a SCISF. The SCISF provides a much more uniform frequency response across the frequency band of interest and significantly improves the signal to noise ratio (SNR) in the higher frequency bins. FIG. 7B is a plot of the error signal ($10 \log|\hat{x}_k - x_k|$) during the training process. The error decreases rapidly during the first few iterations and is nearly converged after only 20-30 iterations. FIG. 7C is a plot of transmitted power spectral density, received power spectral density and the additive noise power spectral density over the used subchannels at the output of the receiver A/D. FIG. 7D is a plot of SNR at the input to the receiver A/D, which is the maximum attainable SNR. The plot also shows the SNR at the output of the receiver DFT without a SCISF and the SNR at the outputs of the receiver DFT using an adapted SCISF.

Figure 8A:
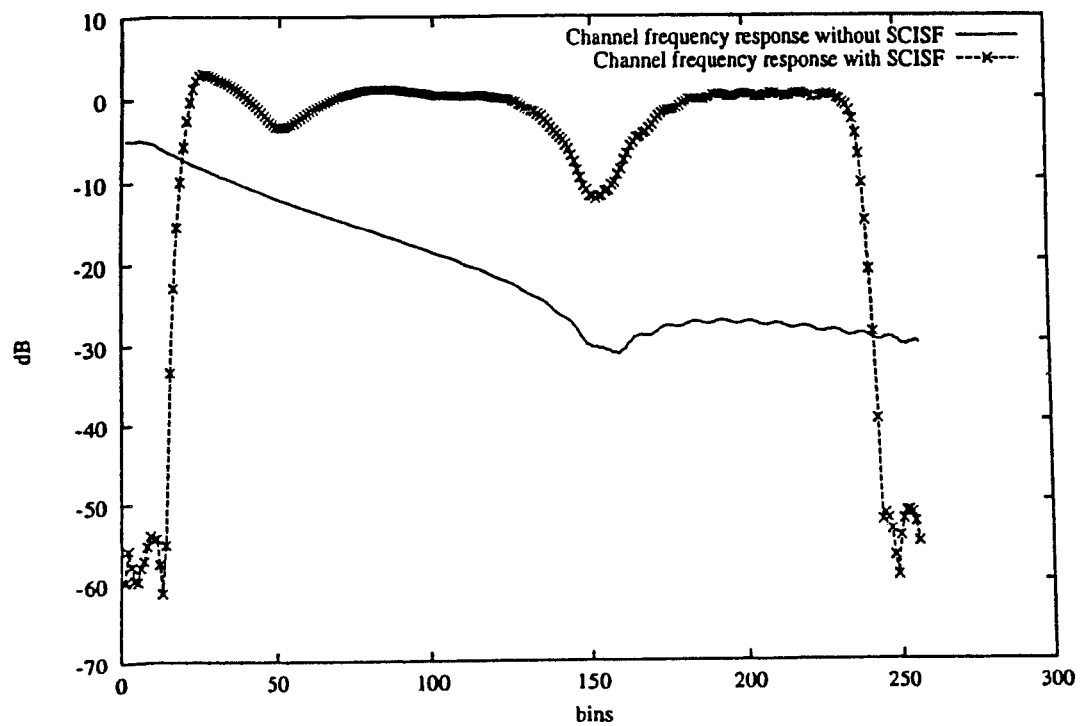
FIGS. 8A-8D are plots of simulation results for a discrete multi-tone system.
Figure 8B:
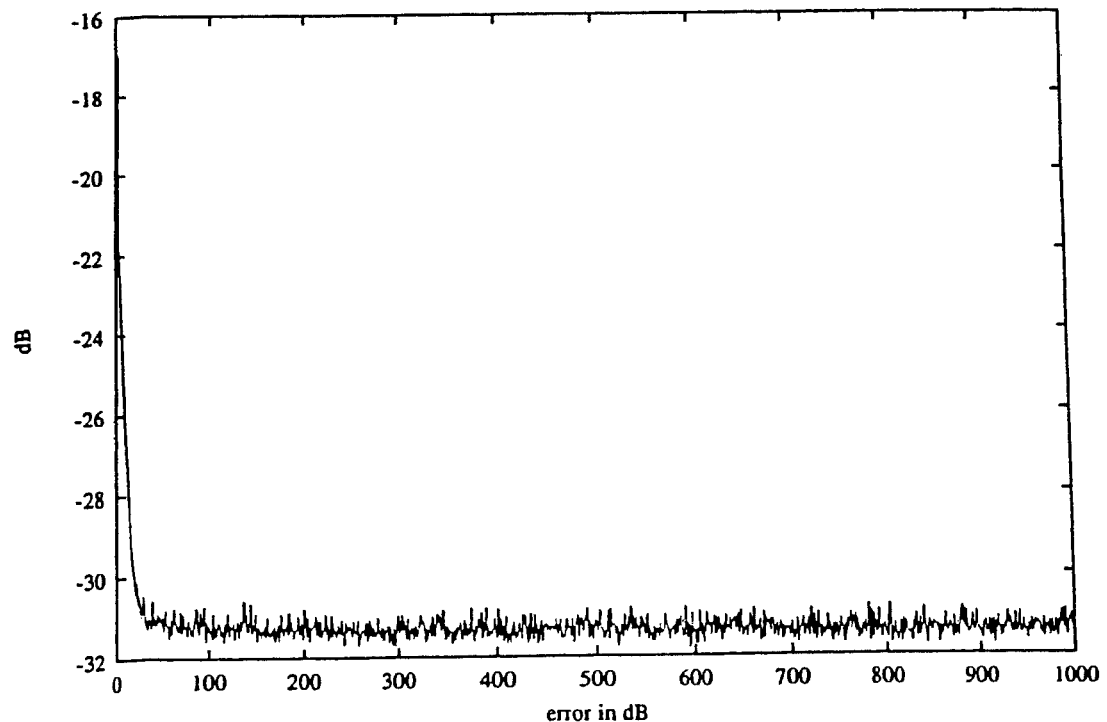
Figure 8C:
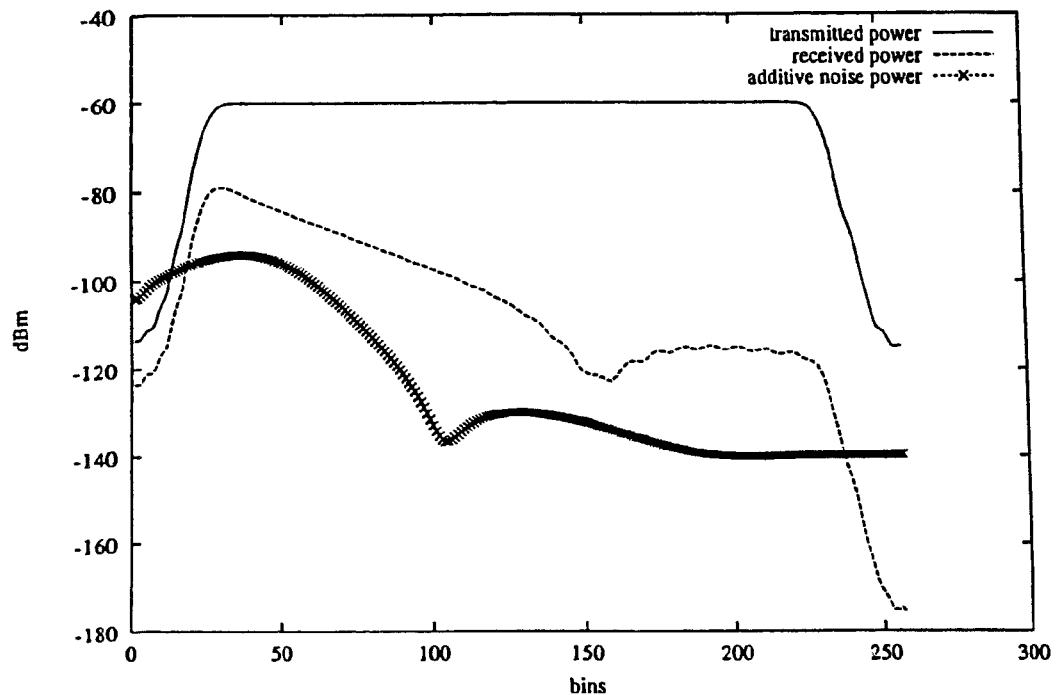
Figure 8D:
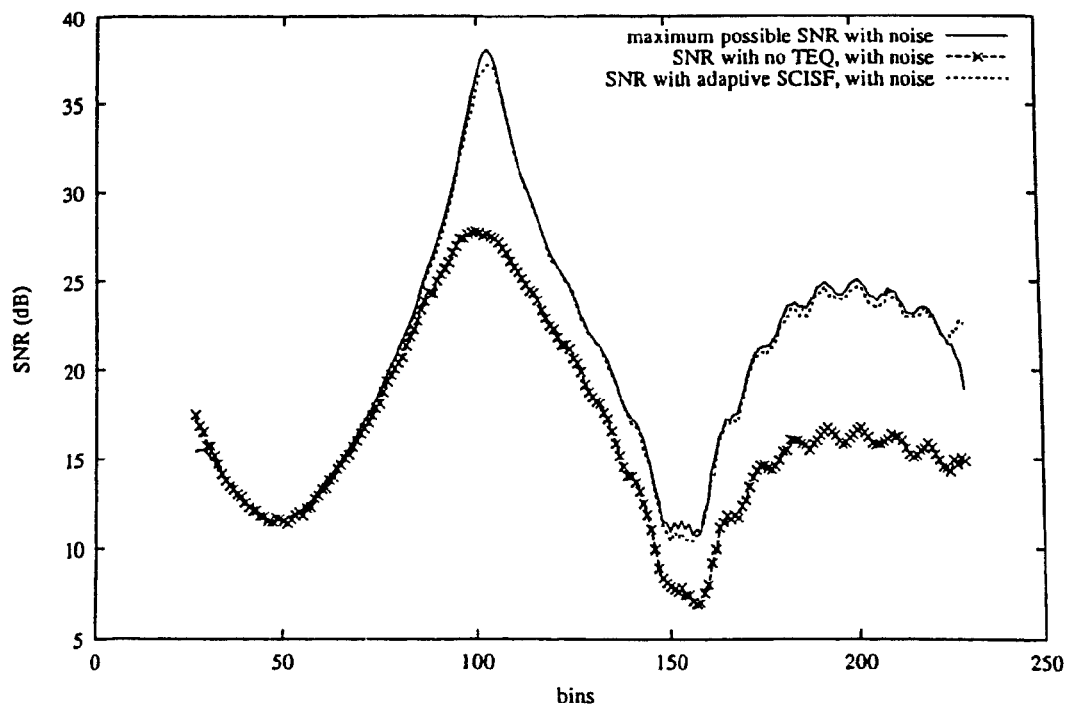

FIGS. 8A-8D show the simulated system performance for a communication system having the parameters defined for Test Loop 6, which is 4500 feet in length. FIG. 8A shows channel frequency response with and without a SCISF, FIG. 8B is a plot of the error signal ($10 \log|\hat{x}_k - x_k|$) during the training process. FIG. 8C is a plot of transmitted power spectral density, received power spectral density and the additive noise power spectral density over the used subchannels at the output of the receiver A/D. FIG. 8D is a plot of SNR at the input to the receiver A/D. The plot also shows the SNR at the output of the receiver DFT without a SCISF and the SNR at the outputs of the receiver DFT using an adapted SCISF.

Other embodiments are within the scope of the following claims.

What is claimed is:

1. A method for computing coefficients of an impulse shortening filter, the method comprising:
    comparing a digital signal received by a spectrally constrained impulse shortening filter and a reference signal and generating an error signal based on a difference between the reference signal and the digital signal; and
    updating coefficients of the spectrally constrained impulse shortening filter based on the error signal.

2. The method of claim 1 wherein the reference signal is a scaled reference signal and further comprising generating the scaled reference signal by scaling a reference signal using a plurality of scaling factors determined based on a desired spectral response.

3. The method of claim 1 further including:
    calculating a noise power spectral density in the digital signal received by the spectrally constrained impulse shortening filter; and
    determining the desired spectral response based on the noise power spectral density.

4. A system for computing coefficients of an impulse shortening filter, the system comprising:
    a comparator configured to compare a digital signal received by a spectrally constrained impulse shortening filter and a reference signal and generate an error signal based on a difference between the reference signal and the digital signal; and an updater configured to determine coefficients for the spectrally constrained impulse shortening filter based on the error signal.

5. The system of claim 4 wherein the reference signal is a scaled reference signal and further comprising a scaling filter configured to generate the reference signal by scaling a reference signal using a plurality of scaling factors determined based on a desired spectral response.

6. The system of claim 4 further including:
a calculator configured to calculate a noise power spectral density in the digital signal received by the spectrally constrained impulse shortening filter; and
a processor configured to determine the spectral response based on the noise power spectral density.

7. A method for adapting an impulse shortening filter, the method comprising:
computing a reference signal by applying a digital signal to a spectrally constrained impulse shortening filter;
delaying the digital signal applied to the spectrally constrained impulse shortening filter to produce a delayed digital signal;
comparing the reference signal to the delayed digital signal and generating an error signal based on a difference between the reference signal and the delayed digital signal; and
updating coefficients of the spectrally constrained impulse shortening filter in an adaptive processor based on the error signal.

8. The method of claim 7 further including:
decoding an output signal obtained from applying the digital data to the spectrally constrained impulse shortening filter; and
computing the reference signal by encoding output data obtained from the output signal.

9. The method of claim 8 wherein computing the reference signal includes applying a discrete Fourier transform to the output signal prior to decoding the output signal.

10. The method of claim 9 wherein computing the reference signal includes applying an inverse discrete Fourier transform to the output data.

11. The method of claim 8 wherein computing the reference signal includes scaling the output data with a plurality of scaling factors based on a desired spectral response.

12. The method of claim 11 further including:
determining the scaling factors by measuring a noise power spectral density in the digital signal received by the spectrally constrained impulse shortening filter;
computing a desired spectral response based on the noise power spectral density; and
determining the scaling factors such that the coefficients for the spectrally constrained impulse shortening filter provide the spectrally constrained impulse shortening filter with a spectral response that matches the desired spectral response.

13. The method of claim 12 further including applying a discrete Fourier transform to the output signal prior to decoding the output signal and measuring the noise power spectral density at an output of the discrete Fourier transform.

14. The method of claim 8 further including scaling the encoded output data and applying an inverse discrete Fourier transform to the scaled encoded output data.

15. A system for adapting an impulse shortening filter, the system comprising:
a first computer configured to compute a reference signal by applying a digital signal to a spectrally constrained impulse shortening filter;
a delayer configured to delay the digital signal applied to the spectrally constrained impulse shortening filter to produce a delayed digital signal;
a comparator configured to compare the reference signal to the delayed digital signal and generate an error signal based on a difference between the reference signal and the delayed digital signal; and
an updater configured to update coefficients of the spectrally constrained impulse shortening filter in an adaptive processor based on the error signal.

16. The system of claim 15 further including:
a decoder arranged to decode an output signal obtained from applying the digital data to the spectrally constrained impulse shortening filter;
an encoder arranged to encode output data obtained from the output signal; and
wherein the first computer is arranged to compute the reference signal using encoded output data.

17. The system of claim 16 wherein the first computer is arranged to compute the reference signal by applying a discrete Fourier transform to the output signal prior to decoding the output signal.

18. The system of claim 17 wherein the first computer is arranged to compute the reference signal by applying an inverse discrete Fourier transform to the output data.

19. The system of claim 15 wherein the first computer is arranged to compute the reference signal by scaling the output data with a plurality of scaling factors.

20. The system of claim 19 wherein the first computer is arranged to determine the scaling factors by:
measuring a noise power spectral density in the digital signal received by the spectrally constrained impulse shortening filter;
computing a desired spectral response based on the noise power spectral density; and
determining the scaling factors such that the coefficients for the spectrally constrained impulse shortening filter provide the spectrally constrained impulse shortening filter with a spectral response that matches the desired spectral response.

21. The system of claim 20 wherein the first computer is arranged to apply a discrete Fourier transform to the output signal prior to decoding the output signal and measure the noise power spectral density at an output of the discrete Fourier transform.

22. The system of claim 16 wherein the first computer is arranged to compute the reference signal by scaling the encoded output data and applying an inverse discrete Fourier transform to the scaled encoded output data.

* * * * *